US009436261B2

(12) United States Patent
Yun

(10) Patent No.: US 9,436,261 B2
(45) Date of Patent: Sep. 6, 2016

(54) BATTERY MANAGEMENT SYSTEM, AND METHOD OF MANAGING THE SAME

(71) Applicant: SAMSUNG SDI CO., LTD., Yongin-si, Gyeonggi-do (KR)

(72) Inventor: Tae-Sung Yun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 216 days.

(21) Appl. No.: 14/209,241

(22) Filed: Mar. 13, 2014

(65) Prior Publication Data
US 2014/0365792 A1 Dec. 11, 2014

Related U.S. Application Data

(60) Provisional application No. 61/831,333, filed on Jun. 5, 2013.

(51) Int. Cl.
*G06F 1/32* (2006.01)
*H02J 7/00* (2006.01)
*H01M 10/42* (2006.01)

(52) U.S. Cl.
CPC .......... *G06F 1/3212* (2013.01); *H01M 10/425* (2013.01); *H02J 7/0004* (2013.01); *H01M 2010/4271* (2013.01); *H01M 2220/20* (2013.01)

(58) Field of Classification Search
CPC ................... H01M 2/10; H02J 3/32
USPC ........................................... 713/1, 320
See application file for complete search history.

(56) References Cited

U.S. PATENT DOCUMENTS

| 5,434,861 | A | * | 7/1995 | Pritty | H04L 12/417 340/3.51 |
| 6,738,920 | B1 | * | 5/2004 | Horne | G05B 19/0423 710/9 |
| 2007/0162764 | A1 | * | 7/2007 | Hass | G06F 21/105 713/187 |
| 2008/0272736 | A1 | | 11/2008 | Tien et al. | |
| 2009/0146610 | A1 | | 6/2009 | Trigiani | |
| 2010/0007311 | A1 | | 1/2010 | Colin et al. | |
| 2011/0029705 | A1 | | 2/2011 | Evans | |
| 2011/0175574 | A1 | * | 7/2011 | Sim | H01M 10/482 320/121 |
| 2012/0007624 | A1 | | 1/2012 | Byeon et al. | |
| 2012/0013290 | A1 | * | 1/2012 | Pariseau | B60L 11/1866 320/106 |

(Continued)

FOREIGN PATENT DOCUMENTS

EP 2357713 A 8/2011
JP 2002-110259 A 4/2002

(Continued)

OTHER PUBLICATIONS

Search Report mailed Jan. 26, 2015 in corresponding European Patent Application No. 14162945.1.

*Primary Examiner* — Vincent Tran
(74) *Attorney, Agent, or Firm* — Lee & Morse, P.C.

(57) ABSTRACT

A battery management system includes a plurality of slave controllers, each slave controller of the plurality of slave controllers being coupled to a respective battery module, each of the slave controllers having a slave controller identifier, the respective slave controller identifiers being allocated by a slave controller identifier allocation operation performed by the plurality of slave controllers, and a master controller, the master controller being coupled to each of the slave controllers, the master controller receiving the slave controller identifiers from the slave controllers.

17 Claims, 19 Drawing Sheets

(56) References Cited

U.S. PATENT DOCUMENTS

| | | | | |
|---|---|---|---|---|
| 2012/0228946 A1* | 9/2012 | Sim | H01M 2/024 | 307/80 |
| 2012/0268069 A1* | 10/2012 | Park | H01M 10/4207 | 320/116 |
| 2013/0108898 A1* | 5/2013 | Potts | H02J 7/0013 | 429/50 |
| 2013/0245788 A1* | 9/2013 | Miyazaki | G05B 19/18 | 700/11 |
| 2014/0091770 A1* | 4/2014 | Lee | H04Q 9/00 | 320/135 |
| 2014/0341484 A1* | 11/2014 | Sebring | G06T 15/205 | 382/284 |

FOREIGN PATENT DOCUMENTS

| | | |
|---|---|---|
| KR | 10-2009-0052532 A | 5/2009 |
| KR | 10-2011-0013747 A | 2/2011 |
| KR | 10-2011-0021798 A | 3/2011 |
| KR | 10-2011-0035247 A | 4/2011 |
| KR | 10-2011-0107626 A | 10/2011 |
| KR | 10-2012-0004768 A | 1/2012 |
| WO | WO 2010/009584 A | 1/2010 |

* cited by examiner

BATTERY MANAGEMENT SYSTEM, AND METHOD OF MANAGING THE SAME

RELATED APPLICATIONS

This application claims the benefit of U.S. Provisional Application No. 61/831,333, filed on Jun. 5, 2013, in the United States Patent and Trademark Office, the disclosure of which is incorporated by reference herein in its entirety.

BACKGROUND

1. Field

Embodiments relate to a battery system, an energy storage system and a vehicle including the battery system, and method of managing the battery system.

2. Description of the Related Art

As environmental destruction, resource depletion, etc., are raised as serious problems, interest in a system capable of storing energy and efficiently using the stored energy has increased. An interest in new ways to generate energy, which induces only a small amount of pollution or none at all in a development process, has also increased.

SUMMARY

Embodiments are directed to a battery management system, including a plurality of slave controllers, each slave controller of the plurality of slave controllers being coupled to a respective battery module, each of the slave controllers having a slave controller identifier, the respective slave controller identifiers being allocated by a slave controller identifier allocation operation performed by the plurality of slave controllers, and a master controller, the master controller being coupled to each of the slave controllers, the master controller receiving the slave controller identifiers from the slave controllers.

The plurality of slave controllers may allocate the slave controller identifiers according to a connection order of the slave controllers.

The plurality of slave controllers may include a serial interconnection such that each slave controller of the plurality of slave controllers is wired together in sequence by the serial interconnection.

Each slave controller of the plurality of slave controllers may sequentially receive a control signal on the serial interconnection and output the control signal after a delay to a subsequent slave controller.

Each respective slave controller may determine a relative position along the serial interconnection according to a delay of the control signal received by the respective slave controller.

The control signal may be progressively delayed by each slave controller such that a final slave controller of the plurality of slave controllers wired together in sequence receives a most-delayed control signal among the plurality of slave controllers.

Each slave controller may include a driving time counter, the driving time counter starting counting when the control signal is received by the slave controller.

The driving time counter may be controlled by a microprocessor in the slave controller, the microprocessor initiating the driving time counter when the slave controller receives the control signal.

Each slave controller may include a delay circuit for delaying the control signal, the delay circuit including a circuit selected from the group of a resistor-capacitor (RC) delay circuit, a resistor-inductor (RL) delay circuit, and a buffer circuit.

The plurality of slave controllers may include a first slave controller and at least one subsequent slave controller, the subsequent slave controller receiving a control signal after a delay from an immediately-preceding slave controller, each slave controller may include a driving time counter activated according to the received control signal, and each slave controller of the plurality of slave controllers may receive a driving time counter value from at least one other slave controller of the plurality of slave controllers and compare the received driving time counter value with a driving time counter value from its driving time counter.

When the comparing indicates that the received driving time counter value is a larger value, the slave controller may increment its slave controller identifier such that the first slave controller has a lowest slave controller identifier and successive slave controllers have successively larger slave controller identifiers.

Each slave controller of the plurality of slave controllers may set its own slave controller identifier and supply the set slave controller identifier to the master controller.

Embodiments are also directed to a power storage system coupled between a power generation system, a load, and a grid system, the power storage system including a battery management system according to an embodiment.

Embodiments are also directed to a vehicle including a battery management system according to an embodiment.

Embodiments are also directed to a method of managing a battery system that includes a plurality of slave controllers that are sequentially connected and a master controller, the method including, in the master controller, transmitting a control signal to a first slave controller of the plurality of slave controllers, in each slave controller of the plurality of slave controllers, receiving the control signal, activating a respective driving time counter in response to the control signal, and outputting the control signal after a delay to a subsequent slave controller among the plurality of slave controllers, the control signal sequentially arriving at each slave controller of the plurality of slave controllers, in the master controller, transmitting a slave controller identifier allocation command to each slave controller of the plurality of slave controllers at the same time, in each slave controller of the plurality of slave controllers, storing a driving time counter value of the respective driving time counter in response to the slave controller identifier allocation command, in each slave controller of the plurality of slave controllers, comparing the stored driving time counter value to at least one other driving time counter value received from another among the plurality of slave controllers, and, in each slave controller of the plurality of slave controllers, setting a slave controller identifier based on the compared driving time counter values.

The method may further include, in the master controller, after transmitting the slave controller identifier allocation command, receiving the set slave controller identifiers from each slave controller of the plurality of slave controllers.

When the comparing indicates that a received driving time counter value is a larger value, the slave controller may increment its slave controller identifier.

A first slave controller among the sequentially connected slave controllers may set a lowest slave controller identifier and successive slave controllers may set successively larger slave controller identifiers.

Each slave controller of the plurality of slave controllers may transmit its stored driving time counter value to all other slave controllers of the plurality of slave controllers.

Embodiments are also directed to a method of managing a battery system that includes a master controller and a plurality of slave controllers that are sequentially connected to the master controller, the method including, in the master controller, sequentially providing a driving power to the plurality of slave controllers, in each slave controller of the plurality of slave controllers, sequentially initiating an operation by receiving the driving power, and sequentially activating a respective driving time counter, in the master controller, transmitting a slave controller identifier allocation command to each slave controller of the plurality of slave controllers at the same time, in each slave controller of the plurality of slave controllers, storing a driving time counter value of the respective driving time counter in response to the slave controller identifier allocation command received by the slave controller, in each slave controller of the plurality of slave controllers, comparing the stored driving time counter value to at least one other driving time counter value received from another among the plurality of slave controllers, and, in each slave controller of the plurality of slave controllers, setting a slave controller identifier based on the compared driving time counter values.

BRIEF DESCRIPTION OF THE DRAWINGS

Features will become apparent to those of skill in the art by describing in detail example embodiments with reference to the attached drawings in which.

DETAILED DESCRIPTION

Figure 1:
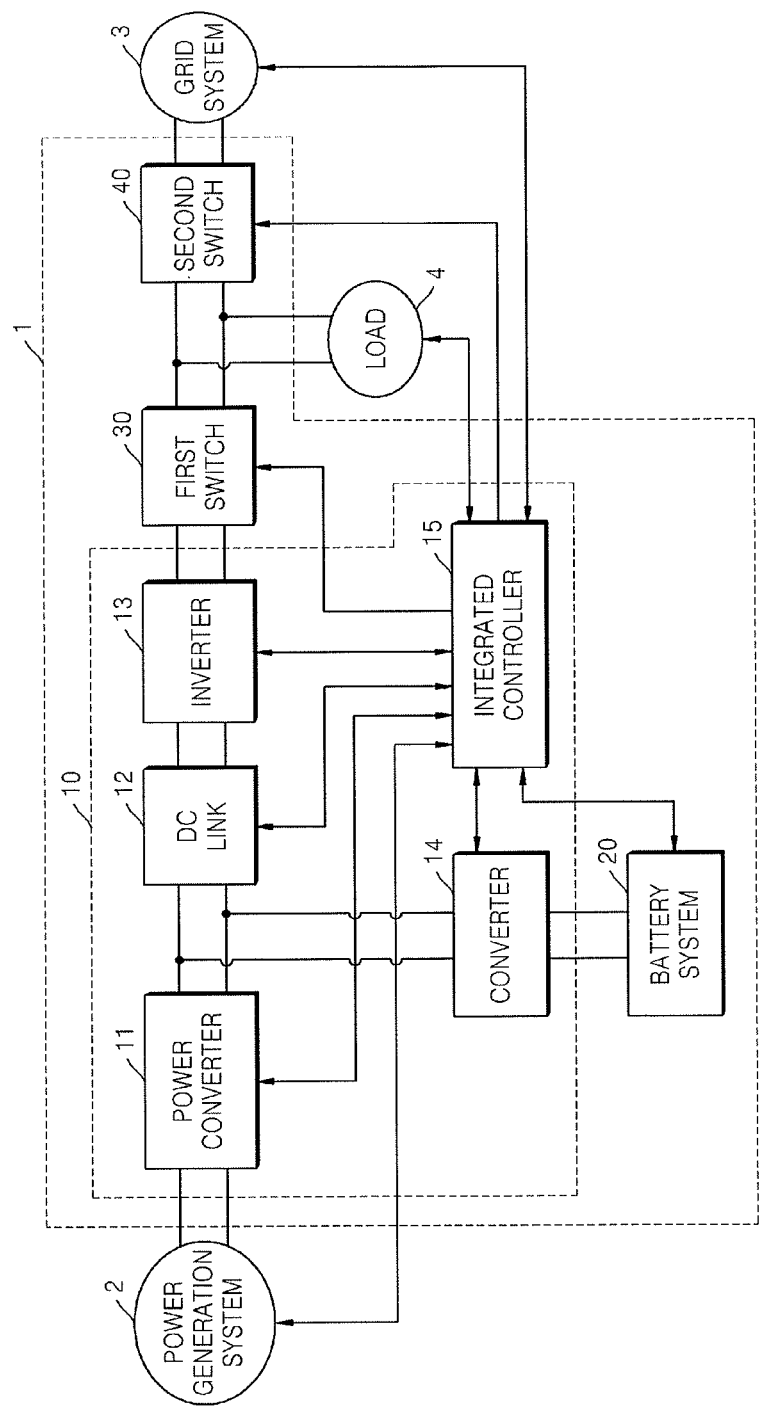
FIG. 1 is a block diagram illustrating an energy storage system according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art. In the drawing figures, dimensions may be exaggerated for clarity of illustration. Like reference numerals refer to like elements throughout.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms, 'first', 'second', etc. may be used herein to describe various elements, these elements should not be limited by these terms. These terms are only used to distinguish one element from another.

FIG. 1 is a block diagram illustrating an energy storage system 1 according to an example embodiment.

In the example embodiment shown in FIG. 1, the energy storage system 1 is connected to a power generation system 2 and a grid 3 to supply power to a load 4.

According to the present example embodiment, the power generation system 2 generates power as an energy source. The power generation system 2 supplies the generated power to the energy storage system 1. The power generation system 2 may include, e.g., one or more of a solar power system, a wind power generation system, and a tidal power generation system, etc. For example, all types of generation systems that produce power by using new generation energy such as solar heat or geothermal heat may be included in the power generation system 2. For example, a solar battery that produces power by using sunlight may be easily installed in a home or a factory, and thus may be used along with the energy storage system 1 installed in a home or a factory. The power generation system 2 may array a plurality of power generating modules capable of generating power in parallel to constitute a high capacity energy system.

The grid 3 may include a power plant, a substation, a power line, etc. When the grid 3 is in a normal state, the grid 3 supplies power to the energy storage system 1, i.e., to at least one of the load 4 and a battery system 20, or is supplied with power from the energy storage system 1, i.e., from the battery system 20. When the grid 3 is in an abnormal state, power supply between the grid 3 and the energy storage system 1 is interrupted.

The load 4 consumes the power produced by the power generation system 2, power stored in the battery system 20, or the power supplied from the grid 3. Electric apparatuses installed in homes or factories are examples of the load 4.

According to the present example embodiment, the energy storage system 1 stores the power produced by the power generation system 2 in the battery system 20 or supplies the power to the grid 3, e.g., the energy storage system 1 supplies the power, which is stored in the battery system 20, to the grid 3, or stores the power, which is supplied from the grid 3, in the battery system 20. The energy storage system 1 supplies the power, which is produced by the power generation system 2 or is stored in the battery system 20, to the load 4. When the grid 3 is in an abnormal state, for example, a power failure occurs, the energy storage system 1 performs an Uninterruptible Power Supply (UPS) function to supply the power, which is produced by the power generation system 2 or stored in the battery system 20, to the load.

According to the present example embodiment, the energy storage system 1 includes a power conversion system (PCS) 10 that converts power, and includes the battery system 20, a first switch 30, and a second switch 40.

According to the present example embodiment, the PCS 10 converts power supplied from the power generation system 2, the grid 3, and the battery system 20 to an appropriate type of power, and supplies the appropriate type of power to a place that demands power. The PCS 10 includes a power converter 11, a direct current (DC) link 12, an inverter 13, a converter 14, and an integrated controller 15.

The power converter 11 may be connected between the power generation system 2 and the DC link 12, and may convert the power produced by the power generation system 2 into a DC link voltage and transmits the DC link voltage to the DC link 12.

The power converter 11 may include a power converter circuit, such as a converter circuit, a rectifier circuit, or the like, depending on a type of the power generation system 2. In the case that the power generation system 2 produces DC power, the power converter 11 may include a DC-DC converter circuit that converts the DC power into DC power of another power level. In the case that the power generation system 2 produces alternating current (AC) power, the power converter 11 may include a rectifier circuit that converts the AC power into DC power.

In the case that the power generation system 2 is a solar-light power generation system, the power converter 11 may include Maximum Power Point Tracking (MPPT) that performs MPPT control to maximize the power produced by the power generation system 2 according to changes in insolation, temperature, etc. Also, when the power generation system 2 does not produce power, the operation of the power converter 11 stops to reduce power consumed by a power conversion apparatus such as a converter or a rectifier circuit.

Although the DC link voltage is desired to be stabilize for normal operations of the converter 14 and the inverter 13, the DC link voltage may become unstable due to a problem such as an instantaneous voltage drop in the power generation system 2 or the grid 3, or a peak load occurrence in the load 4. According to the present example embodiment, the DC link 12 is connected between the power converter 11 and the inverter 13 to uniformly maintain the DC link voltage. An example of the DC link 12 may include a large capacitor.

The inverter 13 may be power conversion apparatus that is connected between the DC link 12 and the first switch 30. The inverter 13 may include an inverter that converts a DC link voltage output from at least one of the power generation system 2 and the battery system 20 into an AC voltage of the grid 3, and outputs the AC voltage. The inverter 13 may also include a rectifier circuit that converts the AC voltage of the grid 3 into a DC voltage and outputs a DC link voltage to store the power of the grid 3 in the battery system 20 in a charging mode. The inverter 13 may be a bidirectional inverter having input and output directions which may be changed.

The inverter 13 may include a filter that removes a harmonic wave from the AC voltage output to the grid 3. The inverter 13 may also include a phase-locked loop (PLL) circuit that synchronizes a phase of the AC voltage output from the inverter 13 and a phase of the AC voltage of the grid 3 to inhibit or limit a generation of reactive power. The inverter 13 may perform functions such as a voltage change range limiter, a power factor improvement, a DC component removal, a transient phenomena protection or reduction, etc.

The converter 14 may be power conversion apparatus that is connected between the DC link 12 and the battery system 20. The converter 14 may include a DC-DC converter that converts the power stored in the battery system 20 into a DC link voltage having an appropriate voltage level and outputs the DC link voltage to the inverter 13 in a discharging mode. The converter 14 may also include a DC-DC converter that converts the power output from the power converter 11 or a voltage of the power output from the inverter 13 into an appropriate voltage level, i.e., a charging voltage level for the battery system 20, and outputs the appropriate voltage level to the battery system 20 in the charging mode. The converter 14 may be a bidirectional converter having input and output directions which may be changed. When charging or discharging of the battery system 20 is not performed, the operation of the converter 14 may be stopped to reduce power consumption.

According to the present example embodiment, the integrated controller 15 monitors states of the power generation system 2, the grid 3, the battery system 20, and the load 4. For example, the integrated controller 15 may monitor whether a power failure has occurred in the grid 3, whether power has been produced by the power generation system 2, an amount of power produced by the power generation system 2, a charged state of the battery system 20, an amount of consumed power of the load 4, a time for which the power is consumed in the load 4, etc.

According to the present example embodiment, the integrated controller 15 controls operations of the power converter 11, the inverter 13, the converter 14, the battery system 20, the first switch 30, and the second switch 40 according to the monitoring result and a preset algorithm. For example, in the case that a power failure occurs in the grid 3, the integrated controller 15 may direct the supply of power stored in the battery system 20 or the power produced by the power generation system 2 to the load 4. If a sufficient amount of power is not supplied to the load 4, the integrated controller 15 may control the load 4 to determine priorities of electric apparatuses of the load 4 and supply power to the electric apparatuses having high priorities. The integrated controller 15 may control charging and discharging of the battery system 20.

According to the present example embodiment, the first switch 30 and the second switch 40 are connected to each other in series between the inverter 13 and the grid 3, and perform on/off operations under control of the integrated controller 15 to control a flow of a current between the power generation system 2 and the grid 3. On/off states of the first switch 30 and the second switch 40 are determined according to states of the power generation system 2, the grid 3, and the battery system 20.

For example, when the power output from at least one of the power generation system 2 and the battery system 20 is supplied to the load 4, or when the power output from the grid 3 is supplied to the battery system 20, the first switch 30 may be turned on. When the power output from at least one of the power generation system 2 and the battery system 20 is supplied to the grid 3, or when the power output from the grid 3 is supplied to at least one of the load 4 and the battery system 20, the second switch 40 may be turned on.

In the case that a power failure occurs in the grid 3, the second switch 40 may be turned off, and the first switch 30 may be turned on. Thus, the power output from at least one of the power generation system 2 and the battery system 20 may be supplied to the load 4, and, simultaneously, the power supplied to the load 4 may be prevented from flowing into the grid 3. As described above, the energy storage system 1 operates as a stand-alone system to prevent a worker working on a power line or the like of the grid 3 from receiving an electric shock due to power output from the power generation system 2 or the battery system 20.

The first and second switches 30 and 40 may include switching apparatuses such as relays capable of enduring or handling a large current.

According to the present example embodiment, the battery system 20 is supplied with the power from at least one of the power generation system 2 and the grid 3, stores the power, and supplies the stored power to at least one of the load 4 and the grid 3. The battery system 20 may include a part that stores power and a part that controls and protects the power. Charging and discharging of the battery system 20 may be controlled by the integrated controller 15.

The battery system 20 will now be described in more detail with reference to FIG. 2A.

Figure 2A:
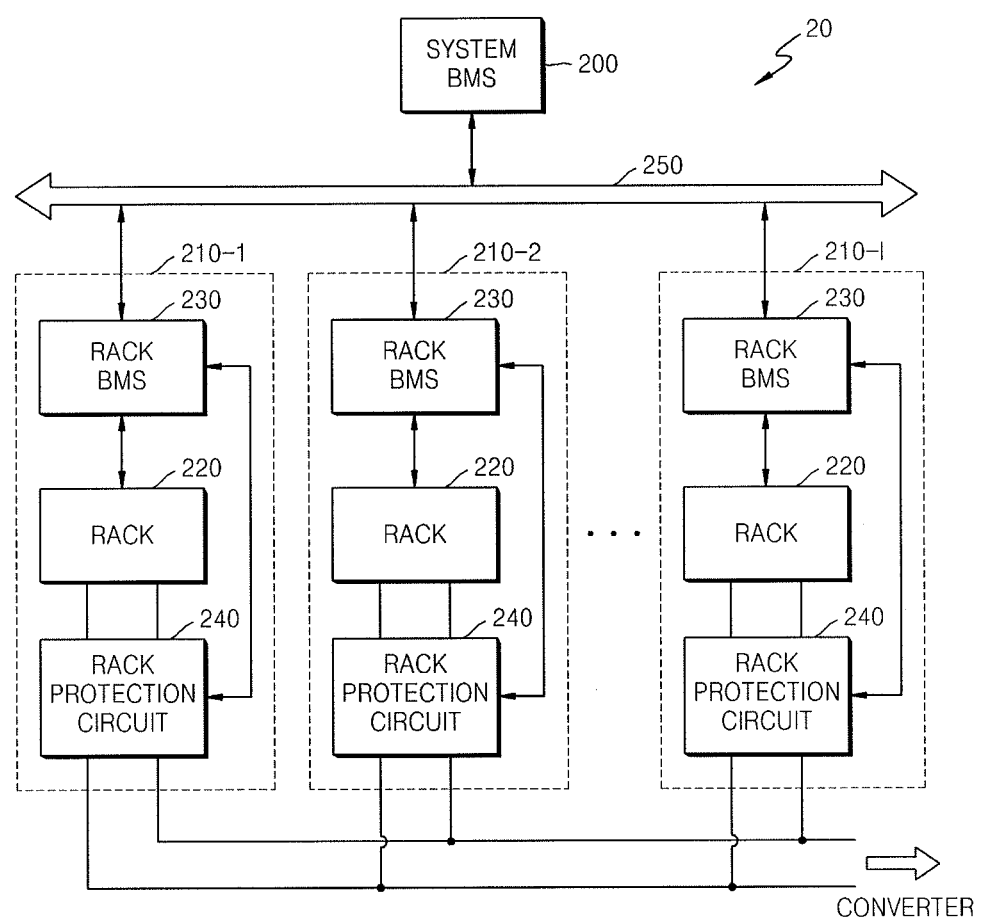
FIG. 2A is a block diagram illustrating a battery system according to an example embodiment.

FIG. 2A is a block diagram illustrating the battery system 20 according to an example embodiment.

In the example embodiment shown in FIG. 2A, the battery system 20 includes a battery management system (BMS) 200, a plurality of battery racks 210-1 through 210-I, and a first bus line 250 for a data communication.

The plurality of battery racks 210-1 through 210-I store power supplied from the outside, i.e., from the power generation system 2 and/or the grid 3, and supply the stored power to the grid 3 and/or the load 4. Each of the plurality of battery racks 210-1 through 210-I includes a rack 220, a rack BMS 230, and a rack protection circuit 240.

The rack 20 stores power and includes one or more trays 222 (see FIG. 2B) that may be connected to one another in series, in parallel, or in series and in parallel. Charging and discharging operations of the racks 220 are controlled by the rack BMSs 230. The racks 220 may be connected to one another in series or in parallel according to a demanded output voltage. The racks 220 of the battery racks 210-1 through 210-I are connected to one another in parallel in FIG. 2A but may be connected to one another in series or in series and in parallel according to a demand of the battery system 20.

The rack BMSs 230 respectively control overall operations of the battery racks 210-1 through 210-I respectively corresponding to the rack BMSs 230. The rack BMSs 230 control the rack protection circuits 240 to control the charging and discharging operations of the racks 220. For example, if an overcurrent flows or an overdischarge occurs, the rack BMSs 230 open switches of the rack protection circuits 240 to interrupt a power transmission between the racks 220 and input/output terminals of the battery system 20. Also, the rack BMSs 230 monitor states of the racks 220, for example, temperatures, voltages, currents, etc. of the racks 220, and transmit measured data to the system BMS 200. The rack BMSs 230 control cell balancing operations of battery cells of the racks 220 according to measured data and a preset algorithm.

The rack protection circuits 240 may operate or short-circuit switches to supply power or interrupt power supply under control of the rack BMSs 230. The rack protection circuits 240 provide output voltages and output currents of the racks 220, states of the switches and fuses, etc.

Power output from the racks 220 is supplied to the converter 14 of FIG. 1 through the rack protection circuits 240, and power supplied from the converter 14 is transferred to the racks 220 for storage, through the rack protection circuits 240. Power lines extending from the rack protection circuits 240 may be connected to the converter 14 in parallel, in series, or in series and in parallel according to an amount of power output from the racks 220, levels of output voltages of the racks 220, etc.

The rack BMSs 230 collect data from the racks 220 and the rack protection circuits 240. The data collected from the rack protection circuits 240 may include an output current value, an output voltage value, a switch state, a fuse state, etc., and the data collected from the racks 220 may include battery cell voltages, temperatures, etc.

The rack BMSs 230 calculate remaining power amounts, life-spans, State of Charge (SOC), etc. of the racks 220, and determine whether abnormalities have occurred in the racks 220. For example, the rack BMSs 230 determine whether the abnormalities, such as overcharge, overdischarge, overcurrent, overvoltage, overheat, battery cell imbalance, deteriorations of the battery cells, etc., have occurred in the racks 220. In the case that the abnormalities have occurred in the racks 220, the rack BMSs 230 perform preset operations according to an internal algorithm. For example, the rack BMSs 230 operate the rack protection circuits 240.

The first bus line 250 is a path through which data or commands are transmitted between the system BMS 200 and the rack BMSs 230. A communication protocol between the system BMS 200 and the rack BMSs 230 may be a CAN communication protocol, another communication protocol that transmits data or commands by using a bus line, etc.

The rack BMSs 230 provide the data collected from the racks 220 and the rack protection circuits 240 to the system BMS 200 through the first bus line 250. The rack BMSs 230 provide the system BMS 200 with information about whether abnormalities have occurred and information about types of the abnormalities. In this case, the system BMS 200 controls the rack BMSs 230. For example, the system BMS 200 transmits a control command to the rack BMSs 230 to operate the rack protection circuits 240 of the battery racks 210-1 through 210-I.

The system BMS 200 transmits the data collected from the rack BMSs 230 to the integrated controller 15 of FIG. 1. The system BMS 200 provides the integrated controller 15 with information about whether abnormalities have occurred in the battery racks 210-1 through 210-I and information about types of the abnormalities of the battery racks 210-1 through 210-I. The integrated controller 15 provides the system BMS 200 with information about a state of the PCS 10, for example, information about a state of the converter 14. For example, the integrated controller 15 provides information about an operating state of the converter 14 or a current flow of the converter 14 to the system BMS 200. The system BMS 200 controls an operation of the battery system 20 based on the information provided from the integrated controller 15. For example, the system BMS 200 transmits a control command to the rack BMSs 230 to turn on the battery racks 210-1 through 210-I according to the state of the PCS 10.

The first battery rack 210-1, as an example of the battery racks 210-1 to 210-I, will now be described with reference to FIG. 2B.

Figure 2B:
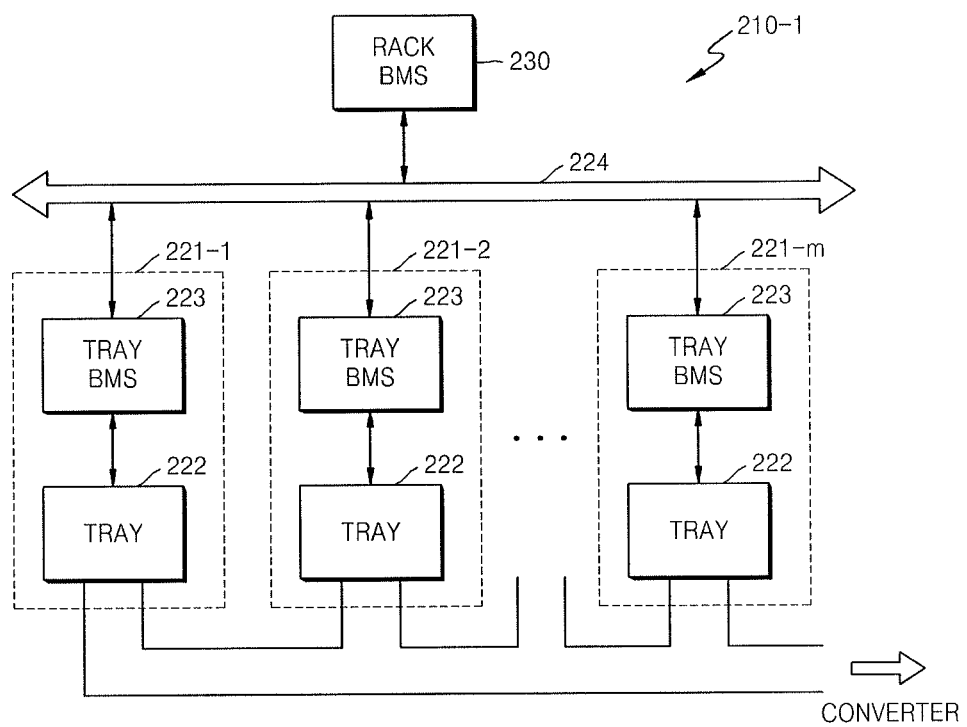
FIG. 2B is a block diagram illustrating a battery rack according to an example embodiment.

FIG. 2B is a block diagram illustrating a battery rack according to an example embodiment.

In the example embodiment shown in FIG. 2B, the battery rack 210-1 includes a plurality of battery trays 221-1 through 221-*m*, the rack BMS 230, and a second bus line 224 for data communications. The battery rack 210-1 may include the rack protection circuit 240 (see FIG. 2A; not shown in FIG. 2B).

The plurality of battery trays 221- through 221-*m* are lower structures of the battery rack 210-1, store power supplied from the grid 3 and/or the power generation system 2, and supply stored power to the grid 3 and/or the load 4. Each of the battery trays 221-1 through 221-*m* includes a tray 222 and a tray BMS 223.

The trays 222 are parts that store power and include one or more battery cells that may be connected to one another in series, in parallel, or in series and in parallel. The number of battery cells included in the tray 222 may be determined according to a demanded output voltage. The battery cells may include rechargeable (secondary) batteries. For example, the battery cells may include nickel-cadmium batteries, nickel metal hydride batteries, lithium ion batteries, lithium polymer batteries, or the like.

Charging and discharging operations of the trays 222 are controlled by the tray BMSs 230. The trays 222 are connected to one another in series to generate output voltages demanded for the racks 220. Power lines extend from the trays 222 positioned at both ends among the trays 222 connected to one another in series, and thus power is supplied to the converter 14 of FIG. 14 through the rack protection circuit 230.

The tray BMSs 223 control the charging and discharging operations of the trays 222. The tray BMSs 223 monitor states of the trays 222, for example, temperatures or voltages of the trays 222, currents flowing in the trays 222, etc. to transmit measured data to the rack BMS 230.

The second bus line 224 is a path through which data or commands are transmitted between the rack BMS 230 and the tray BMSs 223. A communication protocol between the rack BMS 230 and the tray BMSs 223 may be a CAN communication protocol, another communication protocol that transmits data or commands by using a bus line, etc.

According to embodiments, the communication protocol between the system BMS 200 and the rack BMS 230 and the communication protocol between the rack BMS 230 and the tray BMSs 223 use the bus lines. In another implementation, one or more of the cases may use a communication protocol using a bus line.

Figure 3A:
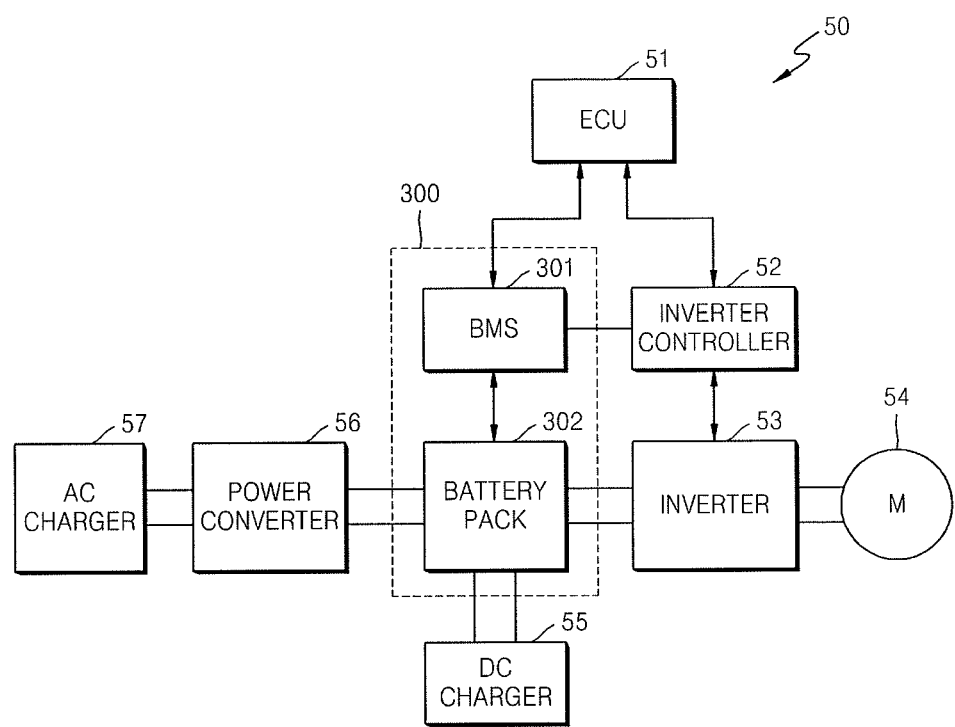
FIG. 3A is a schematic block diagram illustrating an electric car according to an example embodiment.

FIG. 3A is a schematic block diagram illustrating an electric vehicle, e.g., a car, 50 according to an example embodiment.

In the example embodiment shown in FIG. 3A, the electric car 50 includes an Electronic Control Unit (ECU) 51, an inverter controller 52, an inverter 53, a motor 54, and a battery system 300. The battery system 300 includes a BMS 301 and a battery pack 302.

When the electric car 50 is driven, the battery pack 302 supplies a voltage to the motor 54 to support production of output power of the motor 54. When the electric car 50 brakes, the motor 54 operates as a generator while the battery pack 302 collects and stores regeneration brake energy of the motor 54. The battery pack 302 is charged with DC power supplied from a DC charger 55 such as a power conversion system or an energy storage system of a power station.

The battery pack 302 may be charged with AC power supplied from an AC charger 57 such as a commercial power source. For this purpose, the electric car 50 includes a power converter 56, the battery pack 302 is connected to the power converter 56, and the power converter 56 converts AC power supplied from the AC charger 57 into DC power.

The BMS 301 detects information about a voltage, a current, a temperature, etc. of the battery pack 302 and diagnoses and manages the SOC of the battery pack 302. The BMS 301 provides information about the voltage, the current, the temperature, the SOC, diagnosis information, etc. to the ECU 51 through a communication line of the electric car 50, for example, a CAN communication line.

The ECU 51 controls a state, a driving mode, etc. of the electric car 50 and controls a movement of the electric car 50 with reference to the information of the battery pack 302 provided from the BMS 301. The ECU 51 controls the inverter 53 through the inverter controller 52. The inverter 53 converts DC power provided from the battery pack 302 into AC power to supply AC power for driving the motor 54. When the electric car 50 brakes, the inverter 53 converts AC power provided from the motor 54 into DC power and provides the DC power to the battery pack 302.

The electric car 50 illustrated in FIG. 3A is merely an example, and embodiments may be applied to various types of modes of transportation, such as a hybrid car, an electric bicycle, an electric motorcycle, etc., or other types of apparatuses and systems including battery systems.

Figure 3B:
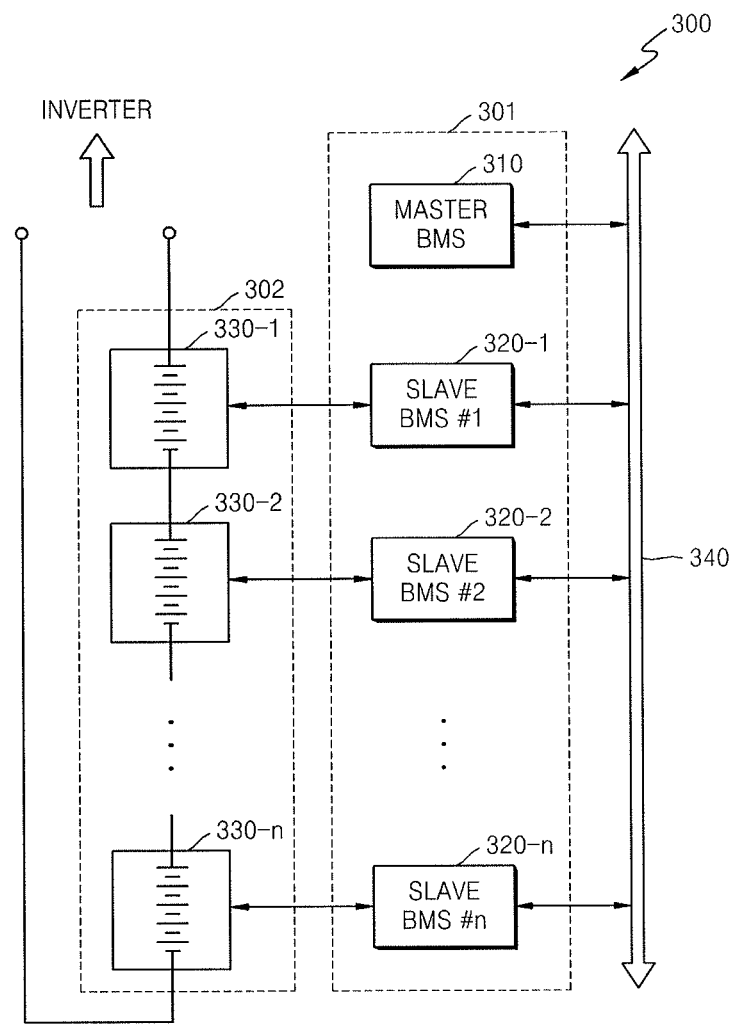
FIG. 3B is a block diagram illustrating a battery system of an electric car according to an example embodiment.

FIG. 3B is a block diagram illustrating a battery system 300 of an electric car according to an example embodiment.

In the example embodiment shown in FIG. 3B, the battery system 300 includes a BMS 301 and a battery pack 302. The battery pack 302 includes a plurality of battery modules 330-1 through 330-*n*.

The battery modules 330-1 through 330-*n* are parts that store power and each include one or more battery cells that are connected to one another in series, in parallel, or in series and in parallel. The number of battery cells of the battery modules 330-1 through 330-*n* may be determined according to a demanded output voltage. The battery cells may include rechargeable batteries. For example, the battery cells may include nickel-cadmium batteries, lead storage batteries, nickel metal hydride batteries, lithium ion batteries, lithium polymer batteries, or the like.

The BMS 301 includes a master BMS 310 and a plurality of slave BMSs 320-1 through 320-*n*.

The master BMS 310 and the plurality of slave BMSs 320-1 through 320-*n* are connected to one another through a third bus line 340 to communicate with one another.

The master BMS 310 manages and controls all of the battery pack 302, calculates information of the battery pack 302, a voltage, a current, a temperature, an SOC, etc. of the battery pack 302, based on information collected from the slave BMSs 320-1 through 320-*n*, and provides the information of the battery pack 302 to the ECU 51.

The plurality of slave BMSs 320-1 through 320-n respectively manage and control the battery modules 330-1 through 330-n. The slave BMSs 320-1 through 320-n collect cell voltages of battery cells of the battery modules 330-1 through 330-n respectively corresponding to the slave BMSs 320-1 through 320-n, temperatures of the battery modules 330-1 through 330-n, etc. and perform cell balancing operations with respect to the battery cells. The slave BMSs 320-1 through 320-n provide information about the collected cell voltages, temperatures, etc. to the master BMS 310 through the third bus line 340.

Charging and discharging operations of the battery modules 330-1 through 330-n are respectively controlled by the plurality of slave BMSs 320-1 through 320-n. The battery modules 330-1 through 330-n are connected to one another in series to generate an output voltage demanded for the battery pack 302. Power lines extend from the battery modules 330-1 and 330-n positioned at both ends of a center among the battery modules 330-1 through 330-n connected to one another in series, to supply power to the inverter 53 of FIG. 3A. The battery modules 330-1 through 330-n are connected to one another in series in FIG. 3B, but this is merely an example, and the battery modules 330-1 through 330-n may be connected to one another in parallel or in series and in parallel.

The third bus line 340 is a path through which data or commands are transmitted between the master BMS 310 and the plurality of slave BMSs 320-1 through 320-n. A communication protocol between the master BMS 310 and the plurality of slave BMSs 320-1 through 320-n may be a CAN communication protocol, another communication protocol that transmits data or commands by using a bus line, etc.

A master-slave structure as described with reference to FIGS. 2A and 2B and FIGS. 3A and 3B will now be described.

Figure 4:
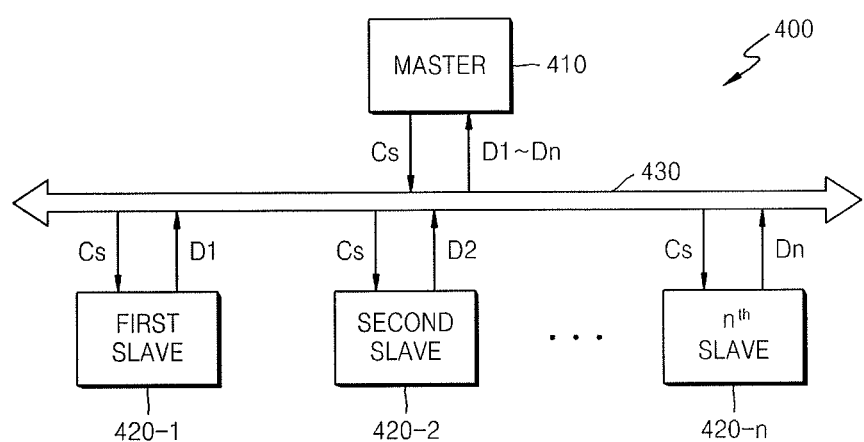
FIG. 4 is a block diagram illustrating a communication system having a master-slave structure according to an example embodiment.

FIG. 4 is a block diagram illustrating a communication system 400 having a master-slave structure according to an example embodiment.

In the example embodiment shown in FIG. 4, the communication system 400 includes a master controller 410, a plurality of slave controllers 420-1 through 420-n, and a fourth bus line 430.

The master controller 410 transmits a frame signal Cs including a command to the fourth bus line 430. First through $n^{th}$ slave controllers 420-1 through 420-n receive the frame signal Cs and perform operations corresponding to the command of the frame signal Cs. The frame signal Cs may include an ID allocation command and may be transmitted to all of the slave controllers 420-1 through 420-n by using a broadcasting method. The frame signal Cs may include a command for controlling the slave controllers 420-1 through 420-n and may be transmitted to the particular slave controllers 420-1 through 420-n by using IDs.

The slave controllers 420-1 through 420-n transmit frame signals D1 through Dn including data to the fourth bus line 430. The first through $n^{th}$ slave controllers 420-1 through 420-n transmit the frame signals D1 through Dn including IDs to the master controller 410 to prevent collisions of the data. The master controller 410 receives the frame signals D1 through Dn and performs demanded processing with respect to the frame signals D1 through Dn.

The frame signals D1 through Dn are transmitted to the master controller 410 and the slave controllers 420-1 through 420-n. For example, the frame signal D1 transmitted from the first slave controller 420-1 may be transmitted to the other slave controllers 420-2 through 420-n by using a broadcasting method. The frame signals D1 through Dn may include data indicating driving time counter values and ID allocation completion signals.

The master controller 410 may correspond to the system BMS 200 of FIG. 2A, and the first through $n^{th}$ slave controllers 420-1 through 420-n may respectively correspond to the rack BMSs 230 of FIG. 2A. The master controller 410 may correspond to the rack BMS 230 of FIG. 2B, and the first through $n^{th}$ slave controllers 420-1 through 420-n may respectively correspond to the tray BMSs 223 of FIG. 2B. The master controller 410 may correspond to the master BMS 310 of FIG. 3B, and the first through $n^{th}$ slave controllers 420-1 through 420-n may respectively correspond to the slave BMSs 320-1 through 320-n of FIG. 3B.

A method of transmitting data in the communication system 400 having the above-described master-slave structure will now be described.

Figure 5:
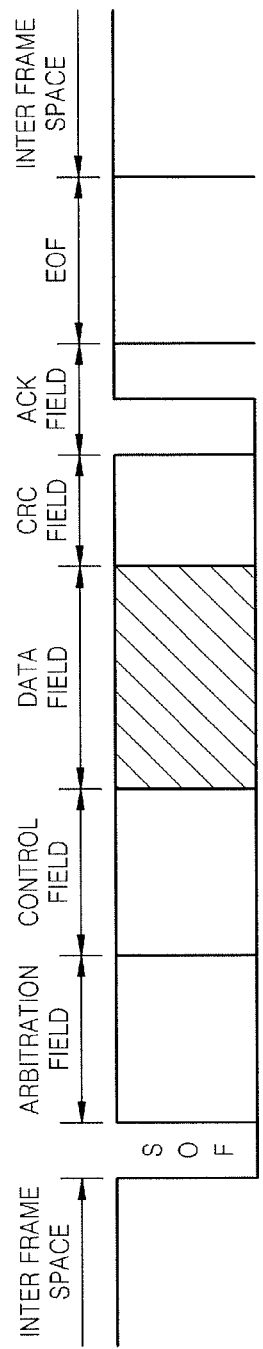
FIG. 5 is a view illustrating a frame structure of a controller area network (CAN) communication protocol

FIG. 5 is a view illustrating a frame structure of a CAN communication protocol. The CAN communication protocol refers to a multi-master message type of serial network communication method that is defined at a speed in ISO 11898 Specification, has been developed by BOSCH to be applied to the car industry fields, and has also been applied to various industry fields.

Referring to FIG. 5, a Start of Frame (SOF) indicates a start of a message frame. The SOF is in a first position of the message frame and has a value of 0 that is a default dominant bit.

An arbitration field has an ID and a remote transmission request (RTR) bit. The RTR bit indicates that the message frame is a data frame or a remote frame. In the case that the message frame is the data frame transmitting data, the RTR bit has a value of 0 (i.e., dominant bit). In the case that the message frame is the remote frame transmitting data, the RTR bit has a value of 1 (i.e., recessive bit).

A control field includes 6 bits. 2 bits of the 6 bits make up a reserved area, and the other four bits make up a data length code area indicating the number of bytes of a data field.

The data field includes data that the data frame is to transmit. A size of the data filed is between about 0 byte and 8 bytes, and each of bytes includes 8 bits. Here, a most significant bit (MSB) 0 of data is first transmitted in each byte.

A cyclic redundancy code (CRC) field indicates a periodical redundancy check code. The CRC field includes a CRC sequence and a CRC delimiter having a value of 1.

An ACK field is formed of 2 bits and includes an ACK slot and an ACK delimiter. The ACK slot that is the first bit has a value of 0, and the ACK delimiter that is the second bit has a value of 1. However, the ACK slot may be recorded as a value of 1 transmitted from another node that has successfully received a message.

An end of frame (EOF) includes 7 bits, all of which have values of 1, to indicate that the message frame has ended.

An interframe space includes an intermission and a bus idle and distinguishes a current message frame from a previous or next message frame.

A method of allocating IDs corresponding to physical orders of a plurality of slave controllers in a communication system including a master controller and the plurality of slave controllers according to an example embodiment will now be described.

Figure 6:
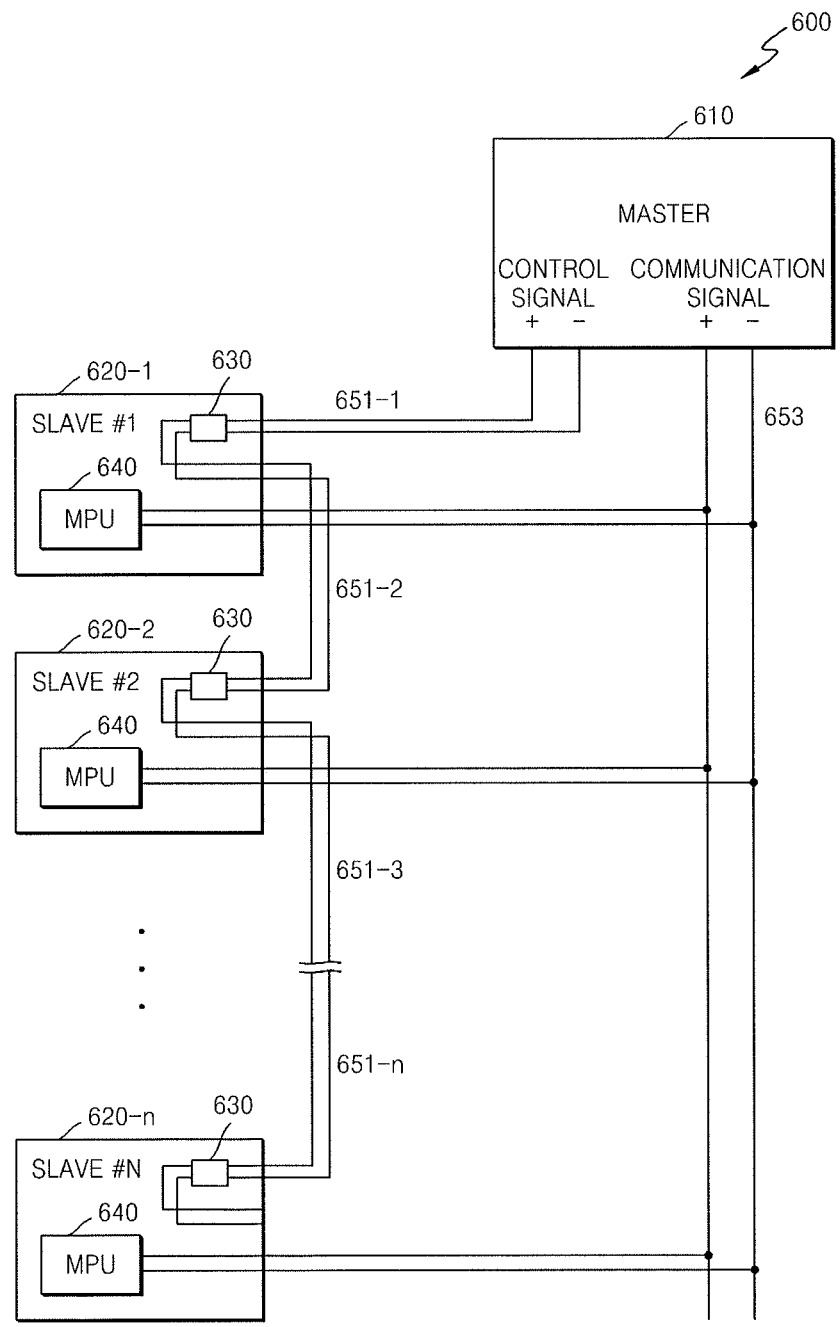
FIG. 6 is a block diagram illustrating a communication system according to an example embodiment.

FIG. 6 is a block diagram illustrating a communication system 600 according to an example embodiment.

IN the example embodiment shown in FIG. 6, the communication system 600 includes a master controller 610 and a plurality of slave controllers 620-1 through 620-n. For ease of understanding, in the embodiment of FIG. 6, the master controller 610 and the plurality of slave controllers 620-1 through 620-n communicate with one another by using a CAN communication method, but other types of communication methods may be used according to the same principle.

The master controller 610 and the slave controllers 620-1 through 620-n are connected to one another through first line pairs 651-1 through 651-n and a second line pair 653 to communicate with one another. A control signal output from the master controller 610 is sequentially transmitted to the slave controllers 620-1 through 620-n through the first line pairs 651-1 through 651-n.

A communication signal output from the master controller 610 is simultaneously transmitted to the plurality of slave controllers 620-1 through 620-n through the second line pair 653. Communication signals output from the plurality of slave controllers 620-1 through 620-n are transmitted to the master controller 610 and/or to the other slave controllers 620-1 through 620-n through the second line pair 653.

The CAN communication is used in the example embodiment shown in FIG. 6. Thus, the control signal is transmitted through the first line pairs 651-1 through 651-n, and the communication signals are transmitted through the second line pair 653. The control signal may be transmitted through a single line or by using an optical communication method or a wireless communication method. The communication signals may also be transmitted by using a serial communication method through the second line pair 653, a parallel communication method using a plurality of lines, an optical communication method, or a wireless communication method.

The control signal may be a power signal for supplying power to the slave controllers 620-1 through 620-n. The master controller 610 generates driving power of the slave controllers 620-1 through 620-n and supplies the driving power to the slave controllers 620-1 through 620-n through the first line pairs 651-1 through 651-n. One of the first line pairs 651-1 through 651-n may transmit a power supply voltage VCC, and one of the first line pairs 651-1 through 651-n may transmit a ground voltage GND.

The control signal may be a digital control signal for activating the slave controllers 620-1 through 620-n. For example, the slave controllers 620-1 through 620-n are activated in response to an activated digital control signal. In the case that the digital control signal is deactivated, the slave controllers 620-1 through 620-n may be deactivated. For example, the digital control signal may be a single-ended signal, one of the first line pairs 651-1 through 651-n may be a signal line on which a signal is loaded, and the other one of the first line pairs 651-1 through 651-n may be a ground line that operates as ground. According to another example, the digital control signal may be a differential signal. In this case, a signal may be loaded on one of the first line pairs 651-1 through 651-n, and an inverse signal is loaded on the other one of the first line pairs 651-1 through 651-n. For ease of understanding, the digital control signal will be described as the single-ended signal, but the digital control signal may be transmitted as a differential signal.

The first line pairs 651-1 through 651-n may be connected between the master controller 610 and the slave controllers 620-1 through 620-n by using a daisy chain method. Thus, the first line pair 651-1 may be connected between the master controller 610 and the first slave controller 620-1, the second line pair 651-2 may be connected between the first slave controller 620-1 and the second slave controller 620-2, and the third line pair 651-3 may be connected between the second slave controller 620-2 and the third slave controller. According to this method, the $n^{th}$ line pair 651-n may be connected between an $n-1^{th}$ slave controller and the $n^{th}$ slave controller 620-n.

The second line pair 653 may be connected between the master controller 610 and the slave controllers 620-1 through 620-n. However, this is only an example embodiment, and the second line pair 653 may be connected between the master controller 610 and the slave controllers 620-1 through 620-n by using the other types of communication methods such as the daisy chain method.

Each of the slave controllers 620-1 through 620-n includes a delay circuit 630 and a Micro Processor Unit (MPU) 640. The delay circuits 630 receive a control signal, delay the received control signal for a preset time and output the delayed control signal. The first line pairs 651-1 through 651-n may be connected to each other by the delay circuits 630 of the slave controllers 620-1 through 620-n.

The delay circuits 630 may be variously designed according to communication methods. For example, in the case that the control signal is an analog signal, the delay circuits 630 may include resistors, capacitors, or coils. In the case that the control signal is a digital signal, the delay circuits 630 may be buffers that are connected to one another in series.

The MPUs 640 control overall operations of the slave controllers 620-1 through 620-n. In the case that the slave controllers 620-1 through 620-n respectively correspond to the rack BMs 230 of FIG. 2A or the tray BMSs 223 of FIG. 2B, the MPUs 640 control battery management operations of the rack BMSs 230 or the tray BMSs 223. The MPUs 640 may be activated in response to the control signal and control transmitting and receiving of a communication signal through the second line pair 653. The MPUs 640 may perform operations corresponding to a control command that is included in the communication signal received through the second line pair 653 and is transmitted from the master controller 610, in response to the control command and transmit the communication signal including the performance results through the second line pair 653.

For example, when the MPUs 640 are activated in response to the received control signal, an internal driving time counter (not shown) may operate. The MPUs 640 receive an ID allocation command from the master controller 610 and store a driving time counter value of the driving time counter in response to the ID allocation command. The MPUs 640 may transmit the stored driving time counter value to the other slave controllers 620-1 through 620-n. The MPUs 640 compare the driving time counter value stored therein with driving time counter values received from the slave controllers 620-1 through 620-n to calculate their IDs and include the calculated IDs in a frame signal to transmit the IDs to the master controller 610.

A plurality of slave controllers will now be described in detail. For ease of understanding, a master controller and a plurality of slave controllers will be described as communicating with one another according to a CAN communication method.

Figure 7A:
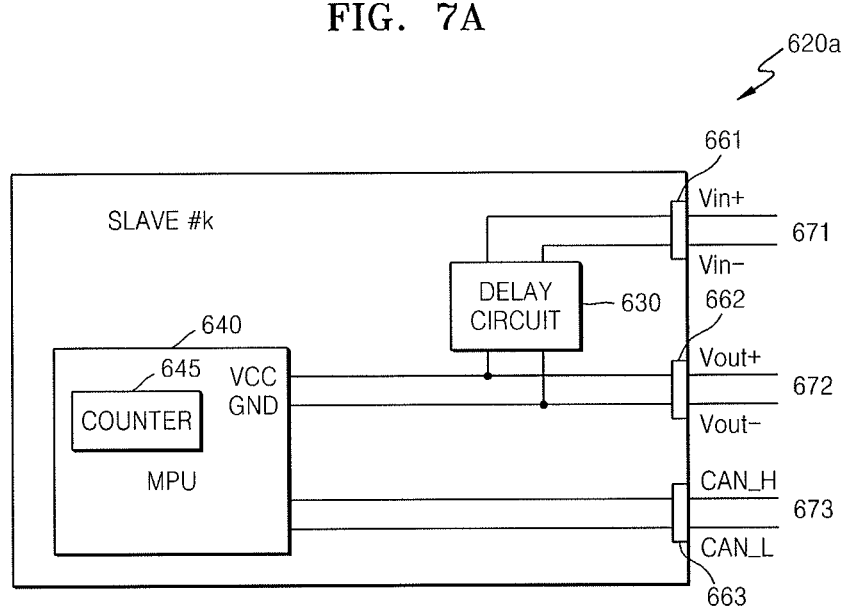
FIG. 7A is a block diagram illustrating a slave controller according to an example embodiment.

FIG. 7A is a block diagram illustrating a slave controller 620a according to an example embodiment.

In the example embodiment shown in FIG. 7A, the slave controller 620a includes an MPU 640, a delay circuit 630, and terminals 661, 662, and 663. The MPU 640 includes a driving time counter 645.

The MPU 640 of the slave controller 620a may be driven by using driving power supplied from the master controller 610. The slave controller 620a includes a power input terminal 661 into which driving power is input from a previous slave controller or the master controller 610, a power output terminal 662 that transmits the driving power to a next slave controller, and a communication signal terminal 663 that receives and transmits a communication signal.

The power input terminal 661 is connected to a first power line pair 671, and the power output terminal 662 is connected to a second power line pair 672. The driving power, which is input into the power input terminal 661 through the first power line pair 671, is input into the delay circuit 630. The delay circuit 630 delays the input driving power and transmits the delayed driving power to the second power line pair 672 through the power output terminal 662. The first power line pair 671 includes a line Vin+ to which a power supply voltage VCC is supplied and a line Vin− to which a ground voltage GND is supplied. The second power line pair 672 includes a line Vout+ to which the power supply voltage VCC is transmitted and a line Vout− to which the ground voltage GND is transmitted.

The communication signal terminal 663 is connected to a communication line pair 673, and the communication line pair 673 includes a first line CAN_H and a second line CAN_L.

The driving power supplied through the power input terminal 661 is provided to the MPU 640, and the MPU 640 starts driving by using the supplied driving power. In FIG. 7A, the delayed driving power output from the delay circuit 630 is supplied to the MPU 640. However, this is merely an example, and driving power that is not delayed and is input into the delay circuit 630 may be applied to the MPU 640. Thus, the MPU 640 is connected to the power output terminal 662 but may be connected to the power input terminal 661.

The MPU 640 starts driving and simultaneously operates the driving time counter 645. When an ID allocation command is received through the communication signal terminal 663, the MPU 640 stores a value of the driving time counter 645 and outputs the stored driving time counter value through the communication signal terminal 663. The MPU 640 receives driving time counter values from slave controllers and compares the stored driving time counter value with the received driving time counter values to calculate an ID thereof. The MPU 640 includes the ID in a frame signal and provides the frame signal including the ID to the master controller 610.

Figure 7B:
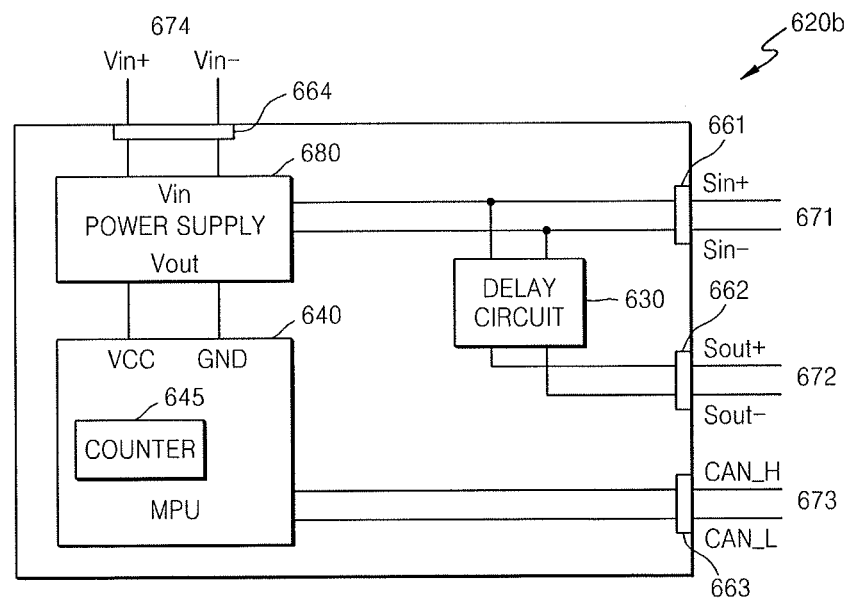
FIG. 7B is a block diagram illustrating a slave controller according to another example embodiment.

FIG. 7B is a block diagram illustrating a slave controller 620*b* according to another example embodiment.

In the example embodiment shown in FIG. 7B, the slave controller 620*b* includes an MPU 640, a delay circuit 630, a power supply unit 680, and terminals 661, 662, 663, and 664. The MPU 640 includes a driving time counter 645.

In the present example embodiment, the MPU 640 of the slave controller 620*b* is not driven by using driving power provided from the master controller 610 but may be driven by using power supplied from an additional power source. The additional power source may be a battery or a power supply that is installed outside the slave controller 620*b*. According to another embodiment, the slave controller 620*b* may include a power source. In the embodiment of FIG. 7B, the MPU 640 of the slave controller 620*b* is supplied with and driven by driving power from an external power source (not shown). However, this is merely an example, and the MPU 640 of the slave controller 620*b* may be modified into various forms.

A power line pair 674 connects the power input terminal 664 to the external power source. The power supply unit 680 is connected to the power input terminal 664, the control signal input terminal 661, and the MPU 640. The power supply unit 680 receives driving power supplied through the power input terminal 664 and supplies the received driving power to the MPU 640 in response to a deactivated control signal. The power supply unit 680 may include a power circuit that starts an operation thereof in response to the control signal. The power circuit may include a regulator circuit or a converter such as a Low Drop Out (LDO) voltage regulator. The power supply unit 680 may include a switch that connects the power input terminal 664 and the MPU 640 in response to the control signal.

The slave controller 620*b* includes the control signal input terminal 661 to which the control signal is transmitted from a previous slave controller or the master controller 610, the control signal output terminal 662 that transmits the control signal to a next slave controller, and the communication signal terminal 663 that receives and transmits a communication signal.

The control signal input terminal 661 is connected to a first control line pair 671, and the first control line pair 671 includes a first line Sin+ and a second line Sin−. The control signal output terminal 662 is connected to a second control line pair 672, and the second control line pair 672 includes a first line Sout+ and a second line Sout−. The communication signal terminal 663 is connected to a communication line pair 673, and the communication line pair 673 includes a first line CAN_H and a second line CAN_L.

The control signal that is in put into the control signal input terminal 661 through the first power line pair 671 is input into the delay circuit 630. The delay circuit 630 delays the input control signal and transmits the delayed control signal to the second control line pair 672 through the control signal output terminal 662.

The control signal supplied from the control signal input terminal 661 is provided to the power supply unit 680, and the power supply unit 680 supplies driving power to the MPU 640 in response to the activated control signal. The MPU 640 starts operating by using the driving power supplied from the power supply unit 680. In the embodiment of FIG. 7B, the power supply unit 680 responds to the control signal input into the control signal input terminal 661. However, this merely an example, and the power supply unit 680 may operate in response to the delayed control signal output from the delay circuit 630.

The MPU 640 starts driving and simultaneously operates the driving time counter 645. When an ID allocation command is received through the communication signal terminal 663, the MPU 640 stores a value of the driving time counter 645 and outputs the stored driving time counter value through the communication signal terminal 663. The MPU 640 receives driving time counter values from other slave controllers through the communication terminal 663 and compares the stored driving time counter with the received driving time counter values to calculate their IDs. The MPU 640 includes the calculated IDs in a frame signal and provides the frame signal including the IDs to the master controller 610 through the communication signal terminal 663.

Figure 7C:
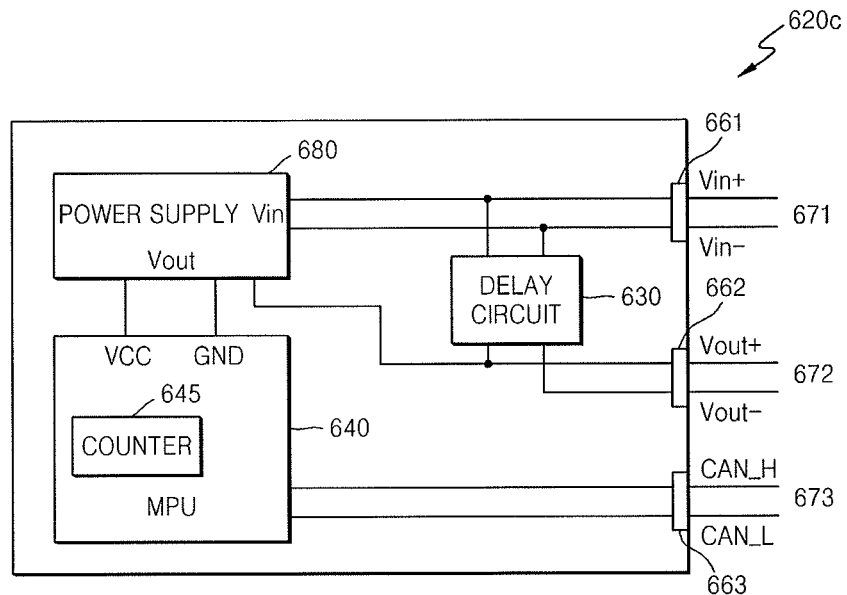
FIG. 7C is a block diagram illustrating a slave controller according to another example embodiment.

FIG. 7C is a block diagram illustrating a slave controller 620*c* according to another example embodiment.

In the example embodiment shown in FIG. 7C, the slave controller 620*c* includes an MPU 640, a delay circuit 630, a power supply unit 680, and terminals 661, 662, and 663. The MPU 640 includes a driving time counter 645.

The MPU 640 of the slave controller 620*c* may be driven by using driving power supplied from the master controller 610. The slave controller 620*c* includes the power input terminal 661 into which driving power transmitted from a previous slave controller or the master controller 610 is input, the power output terminal 662 that transmits the driving power to a next slave controller, and the communication signal terminal 663 that receives and transmits a communication signal.

The power input terminal 661 is connected to a first power line pair 671, and the first power line pair 671 includes a line Vin+ to which a power supply voltage VCC is supplied and a line Vin− to which a ground voltage GND is supplied. The power output terminal 662 is connected to a second power line pair 672, and the second power line pair 672 includes a line Vout+ to which the power supply voltage VCC is transmitted and a line Vout− to which the ground voltage GND is transmitted. Driving power input into the power input terminal 661 through the first power line pair 671 is input into the delay circuit 630. The delay circuit 630 delays the input driving power and transmits the delayed driving power to the second power line pair 672 through the power output terminal 662.

The communication signal terminal 663 is connected to a communication line pair 673, and the communication line pair 673 includes a first line CAN_H and a second line CAN_L.

The power supply unit 680 is connected to the power input terminal 661, the power output terminal 662, and the MPU 640. The power supply unit 680 receives the driving power supplied through the power input terminal 661. The delayed driving power output from the delay circuit 630 may be provided as an activated control signal to the power supply unit 680. The power supply unit 680 supplies the MPU 640 with the driving power supplied through the power input terminal 661 in response to the activated control signal output from the delay circuit 630.

The power supply unit 680 starts an operation in response to the activated control signal and may include a regulator circuit or a converter such as an LDO voltage regulator. The power supply unit 680 may include a switch that connects the power input terminal 661 and the MPU 640 to each other in response to the activated control signal.

The driving power supplied through the power input terminal 661 is provided to the MPU 640 through the power supply unit 680, and the MPU 640 starts driving by using the supplied driving power.

The MPU 640 starts driving and simultaneously operates the driving time counter 645. When an ID allocation command is received through the communication signal terminal 663, the MPU 640 stores a value of the driving time counter 64 and outputs the stored driving time counter value through the communication signal terminal 663. The MPU 640 receives driving time counter values from other slave controllers through the communication signal terminal 63 and compares the stored driving time counter value with the received driving time counter values to calculate their IDs. The MPU 640 includes the calculated IDs in a frame control and provides the frame signal including the IDs to the master controller 610 through the communication signal terminal 663.

A delay circuit will now be described in more detail.

FIGS. 8A through 8G are circuit diagrams illustrating delay circuits included in a slave controller according to various example embodiments.

Figure 8A:
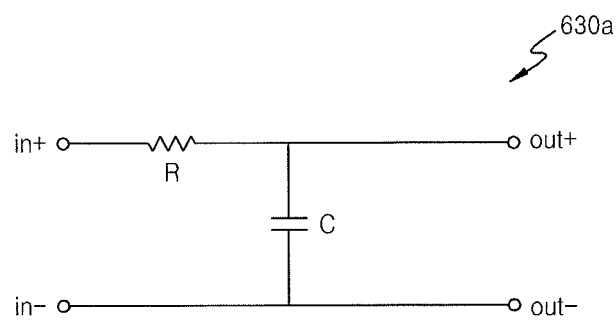
FIGS. 8A through 8G are circuit diagrams illustrating delay circuits included in slave controllers according to various example embodiments.

Referring to FIG. 8A, a delay circuit 630a includes a resistor R connected between a first input terminal in+ and a first output terminal out+ and a capacitor C connected between the first output terminal out+ and a second output terminal out−. A second input terminal in− and the second output terminal out− are connected to each other.

The first input terminal in+ and the second input terminal in− may correspond to the input terminal 661 shown in FIGS. 7A through 7C, and the first output terminal out+ and the second output terminal out− may correspond to the output terminal 662 shown in FIG. 7A through 7C.

In the case that driving power is transmitted from the master controller 610 to the slave controllers 620-1 through 620-n, a power supply voltage VSS may be applied to the first input terminal in+, and a ground voltage may be applied to the second input terminal in−. A delayed power supply voltage VSS may be output to the first output terminal out+, and the ground voltage GND may be output to the second output terminal in−. In the case that the power supply unit VSS is applied in a unit pulse form to the first input terminal in+, a power supply voltage waveform that gradually increases appears at the first output terminal out+. After the power supply voltage VSS is applied to the first input terminal in+, a voltage of the first output terminal out+ is delayed by a preset time and then reaches a driving voltage Vth that drives the MPU 640. The preset time is determined by values of the resistor R and the capacitor C. The preset time is determined by a time constant RC that is obtained by multiplying the values of the resistor R and the capacitor C together.

In the case that a digital control signal is transmitted from the master controller 610 to the slave controllers 620-1 through 620-n, a signal line on which the digital control signal is loaded may be connected to the first input terminal in+, and a ground line may be connected to the second input line in−.

Figure 8B:
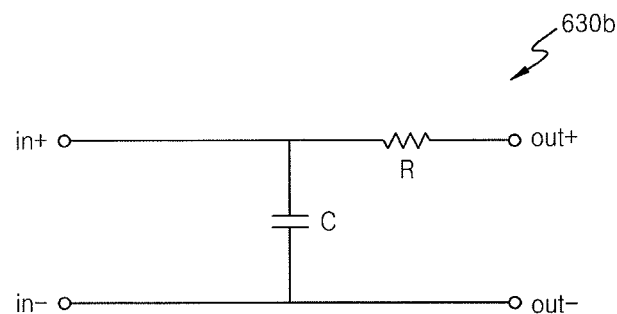

Referring to FIG. 8B, a delay circuit 630b includes a resistor R connected between a first input terminal in+ and a first output terminal out+, and a capacitor connected between the first input terminal in+ and a second input terminal in−. The second input terminal in− and a second output terminal out− are connected to each other.

Figure 8C:
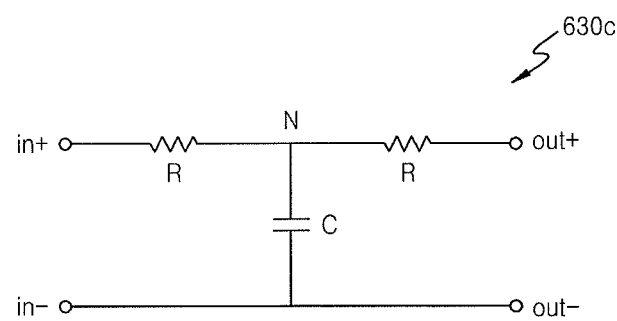

Referring to FIG. 8C, a delay circuit 630c includes two resistors R that are connected to each other in series between a first input terminal in+ and a first output terminal out+ and a capacitor that is connected between a node N between the two resistors R and the second input terminal in−. The second input terminal in− and the second output terminal out− are connected to each other.

Figure 8D:
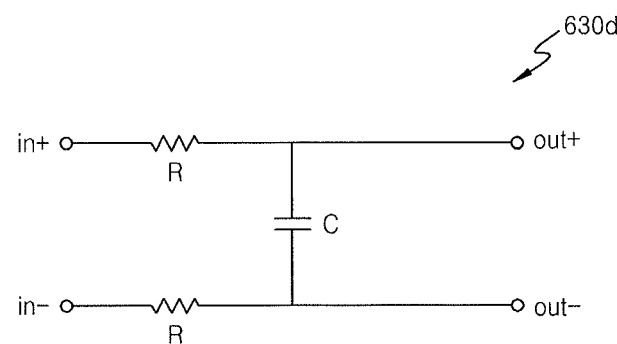

Referring to FIG. 8D, a delay circuit 630d includes a resistor R connected between a first input terminal n+ and a first output terminal out+, a resistor R connected between a second input terminal in− and a second output terminal out−, and a capacitor connected between a first output terminal out+ and a second output terminal out−. The delay circuit 630d is usefully used when a digital control signal transmitted from the master controller 610 to the slave controllers 620-1 through 620-n is a differential signal. The capacitor C may not be connected between the first output terminal out+ and the second output terminal out− but may be connected between the first input terminal in+ and the second input terminal in−. A resistor R may be further connected between the first output terminal out+ and the capacitor C, and a resistor R may be further connected between the second output terminal out− and the capacitor C.

Figure 8E:
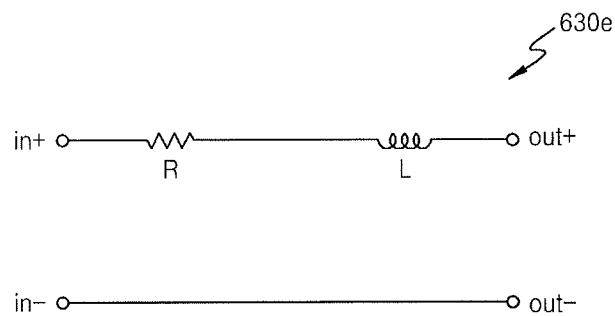

Referring to FIG. 8E, a delay circuit 630e includes a resistor R and a coil L that are connected to each other in series between a first input terminal in+ and a first output terminal out+. A second input terminal in− and a second output terminal out− are connected to each other.

Figure 8F:
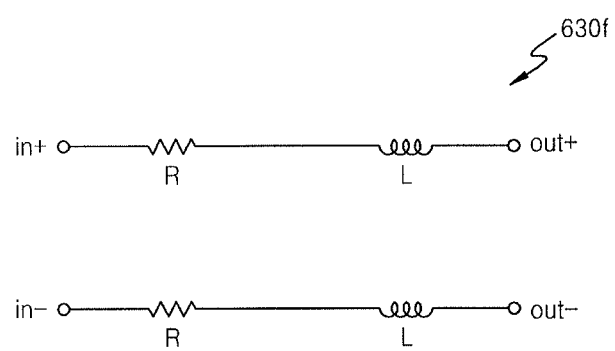

Referring to FIG. 8F, a delay circuit 630f includes a resistor R and a coil L that are connected to each other in series between a first input terminal in+ and a first output terminal out+ and a resistor R and a coil L that are connected to each other in series between a second input terminal in− and a second output terminal out−. The delay circuit 630f is usefully used when a digital control signal transmitted from the master controller 610 to the slave controllers 620-1 through 620-n is a differential signal.

Figure 8G:
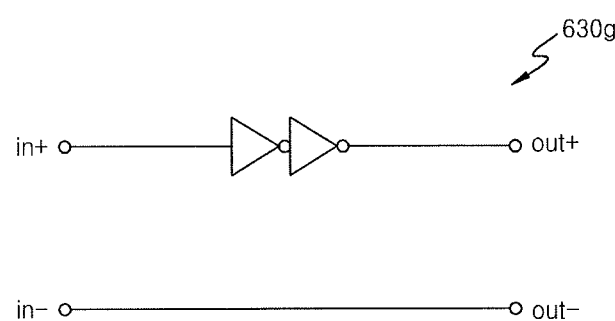

Referring to FIG. 8G, a delay circuit 630g includes a buffer connected between a first input terminal in+ and a first output terminal out+. A second input terminal in− and a second output terminal out− are connected to each other. The buffer may include an even number of inverters that are connected to one another in series. The delay circuit 630g is useful when a digital control signal is transmitted from the master controller 610 to the slave controllers 620-1 through 620-n. In the case that the digital control signal is a differential signal, the delay circuit 630g may further include a buffer that is connected between the second input terminal in− and the second output terminal out−.

Figure 9:
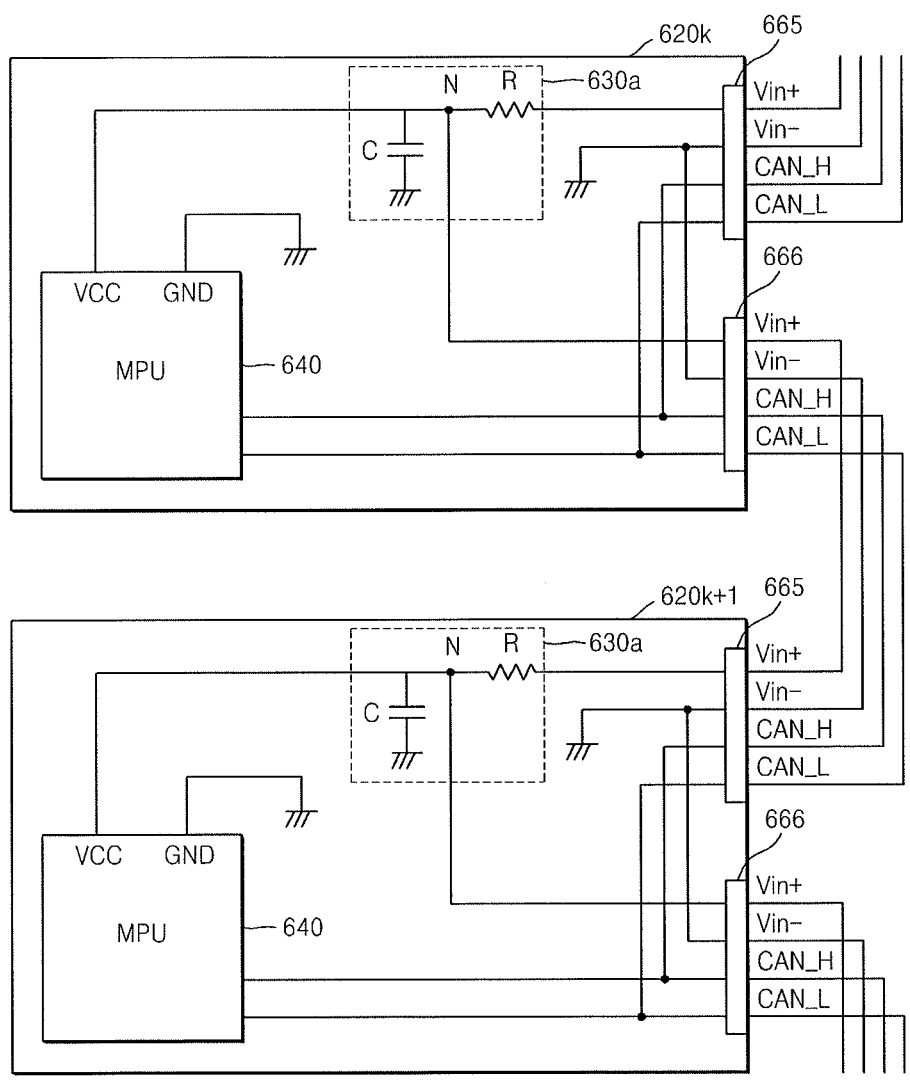
FIG. 9 is a block diagram illustrating slave controllers using the delay circuit of FIG. 8A, according to an example embodiment.

FIG. 9 is a block diagram illustrating slave controllers using the delay circuit 630a of FIG. 8A, according to an example embodiment.

In the example embodiment shown in FIG. 9, a $k^{th}$ slave controller 620k and a $k+1^{th}$ slave controller 620k+1 are illustrated.

Each of the $k^{th}$ slave controller 620k and the $k+1^{th}$ slave controller 620k+1 includes the delay circuit 630a and the MPU 640 of FIG. 8A. Each of the $k^{th}$ slave controller 620k and the $k+1^{th}$ slave controller 620k+1 includes an input terminal 665 and an output terminal 666.

The input terminal 665 of the $k^{th}$ slave controller 620k is connected to the output terminal of the $k-1^{th}$ slave controller (not shown) through four lines. The four lines include a first power line Vin+ and a second power line Vin− to which driving power is transmitted, and a first communication line CAN_H and a second communication line CAN_L to which a communication signal using a CAN communication method is transmitted.

The output terminal 666 of the $k^{th}$ slave controller 620k is connected to the input terminal 665 of the $k+1^{th}$ slave controller 620+1 through four lines. The four lines also include a first power line Vin+ and a second power line Vin− to which driving power is transmitted, and a first communication line CAN_H and a second communication line CAN_L to which a communication signal using a CAN communication method is transmitted.

The output terminal 666 of the $k+1^{th}$ slave controller 620+1 is connected to an input terminal of a $k+2^{th}$ slave controller (not shown in FIG. 9). In the example embodiment shown in FIG. 9, the $k^{th}$ slave controller 620k and the $k+1^{th}$ slave controller 620k+1 operate by using driving power provided from the master controller 610. However, this is merely an example and the $k^{th}$ slave controller 620k and the $k+1^{th}$ slave controller 620k+1 may have various forms.

In the $k^{th}$ slave controller 620k, the first communication line CAN_H and the second communication line CAN_L connected to the input terminal 665 are respectively directly connected through internal lines to the first communication line CAN_H and the second communication line CAN_L connected to the output terminal 666. The first communication line CAN_H and the second communication line CAN_L connected to the input terminal 665 are respectively connected to a communication terminal of the MPU 640 through internal lines.

In the $k^{th}$ slave controller 620k, the second power line Vin− connected to the input terminal 665 is grounded and is directly connected through an internal line to the second power line Vin− connected to the output terminal 666.

The first power line Vin+ connected to the input terminal 665 is connected to the delay circuit 630a. The first power line Vin+ connected to the output terminal is connected to a node of the delay circuit 630a. The delay circuit 630a includes a resistor R that is connected between the first power line Vin+ connected to the input terminal 665 and the node N and a capacitor C that is connected between the node N and a ground GND. The node N is connected to a power supply terminal VCC of the MPU 640, and a ground terminal GND of the MPU 640 is grounded. A voltage of the node N is applied to the power supply terminal VCC of the MPU 640.

In the case that a power supply voltage is applied through the first power line Vin+ connected to the input terminal 665 of the $k^{th}$ slave controller 620k, the voltage of the node N slowly increases due to the capacitor C. Therefore, after a preset time passes compared to a time when a power supply voltage is first applied to the first power line Vin+ connected to the input terminal 665, the MPU 640 of the $k^{th}$ slave controller 620k starts to be driven. Since the capacitor C is connected to the node N of the $k+1^{th}$ slave controller 620k+1, the voltage of the node N of the $k+1^{th}$ slave controller 620k+1 increases more slowly than the voltage of the node N of the $k^{th}$ slave controller 620k. Therefore, after a preset time passes from when the MPU 640 of the $k^{th}$ slave controller 620k starts to be driven, the MPU 640 of the $k+1^{th}$ slave controller 620k+1 starts to be driven.

Therefore, the MPU 640 of the $k^{th}$ slave controller 620k is first activated, and then the MPU 640 of the $k+1^{th}$ slave controller 620k+1 is activated.

Figure 10:
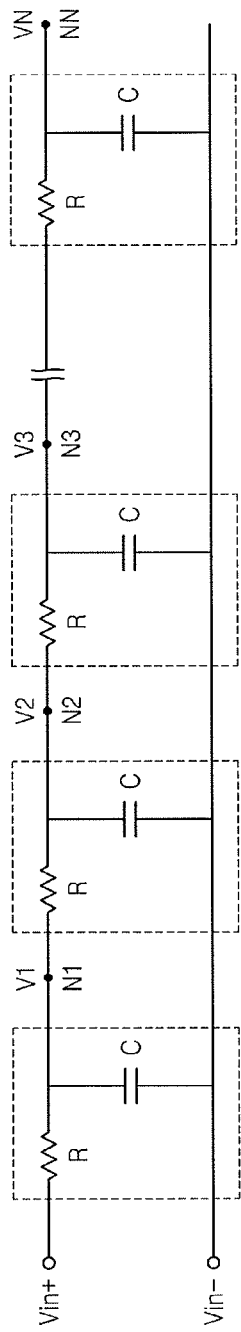
FIG. 10 is an equivalent circuit diagram illustrating power lines pairs between the master controller and the slave controllers according to an example embodiment.

FIG. 10 is an equivalent circuit diagram of power line pairs in which the slave controllers of FIG. 9 are connected to one another, according to an example embodiment.

Referring to FIG. 10, a first power terminal Vin+ and a second power terminal Vin− are connected to the master slave controller 610, and the master slave controller 610 supplies driving power to the slave controllers 620-1 through 620-n through the first power terminal Vin+ and the second power terminal Vin−.

The first slave controller 620-1 uses a voltage V1 of a first node N1 as driving power, and the second slave controller 620-2 uses a voltage V2 of a second node N2 as driving power. The $n^{th}$ slave controller 620-n uses a voltage VN of an $n^{th}$ node NN as driving power. A ground voltage GND is applied to the second power terminal Vin−.

n resistors R are connected to one another in series between the first power line Vin+ and the $n^{th}$ node NN, nodes between the resistors R may respectively equivalently correspond to the first through $n-1^{th}$ nodes N1 through N(N−10). Capacitors C are respectively connected between each of the first through $N^{th}$ nodes N1 through NN and the second power terminal Vin−.

Figure 11:
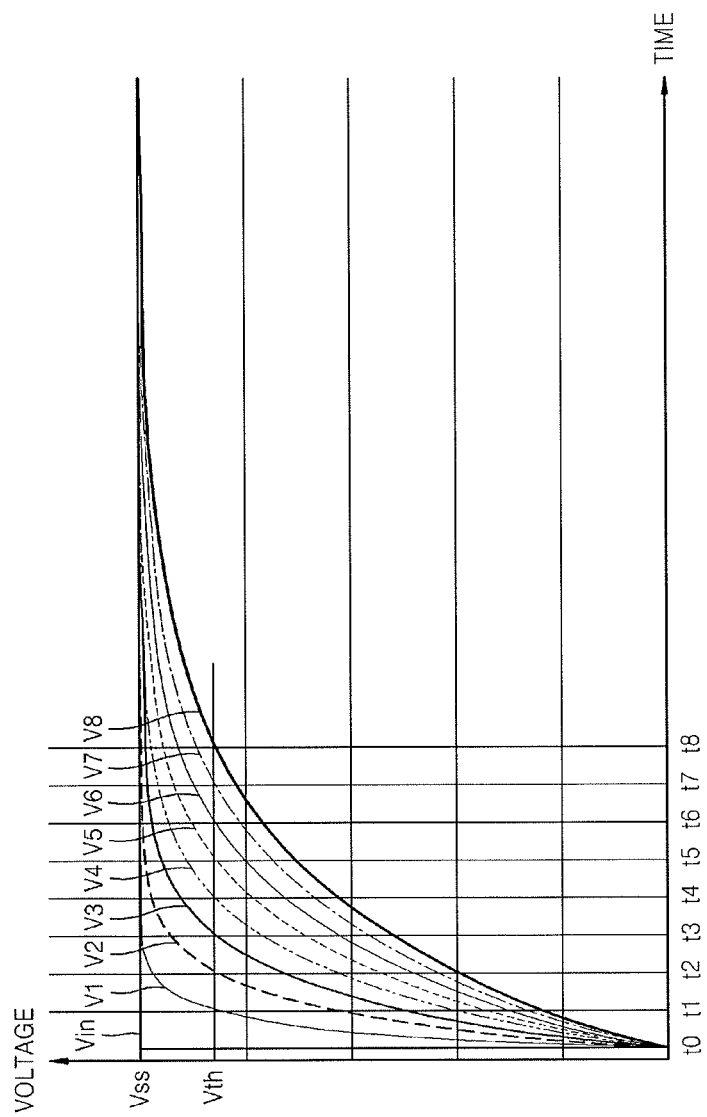
FIG. 11 is a graph illustrating voltages V1 through VN generated when a driving voltage is applied to the equivalent circuit of FIG. 9.

FIG. 11 is a graph illustrating voltages V1 through VN when a driving voltage is supplied to the equivalent circuit of FIG. 9.

In the example embodiment shown in FIG. 11, the second power terminal Vin− is grounded, and a power supply voltage VSS is applied to the first power terminal Vin+ at a time t0. A driving voltage Vth is a voltage at which the MPUs 640 of the slave controllers 620-n start to be driven.

A first voltage V1 of a first node N1 reaches a driving voltage Vth at a time t1, and the MPU 640 of the first slave controller 620-1 is activated at the time t1. A second voltage V2 of a second node N2 reaches the driving voltage Vth at a time t2, and the MPU 640 of the second slave controller 620-2 is activated at the time t2. A third voltage V2 of a third node N3 reaches the driving voltage Vth at a time t3, and the MPU 640 of the third slave controller 620-3 is activated at the time t3. According to this method, an $n^{th}$ voltage VN of an $n^{th}$ node NN reaches the driving voltage Vth at a time tn, and the MPU 640 of the nth slave controller 620-$n$ is activated at the time tn. For example, in the case that a resistor R is 10Ω and a capacitor C is 1 μF in the equivalent circuit of FIG. 10, time intervals between the times t0 through tn are each about 20 μs. In the case that the resistor R is 10 kΩ and the capacitor C is 0.1 μF, the time intervals between the times t0 through tn are each about 2 ms. The resistor R and the capacitor C values may be set so that the driving time counter 645 of the MPU 640 senses the time intervals.

Figure 12:
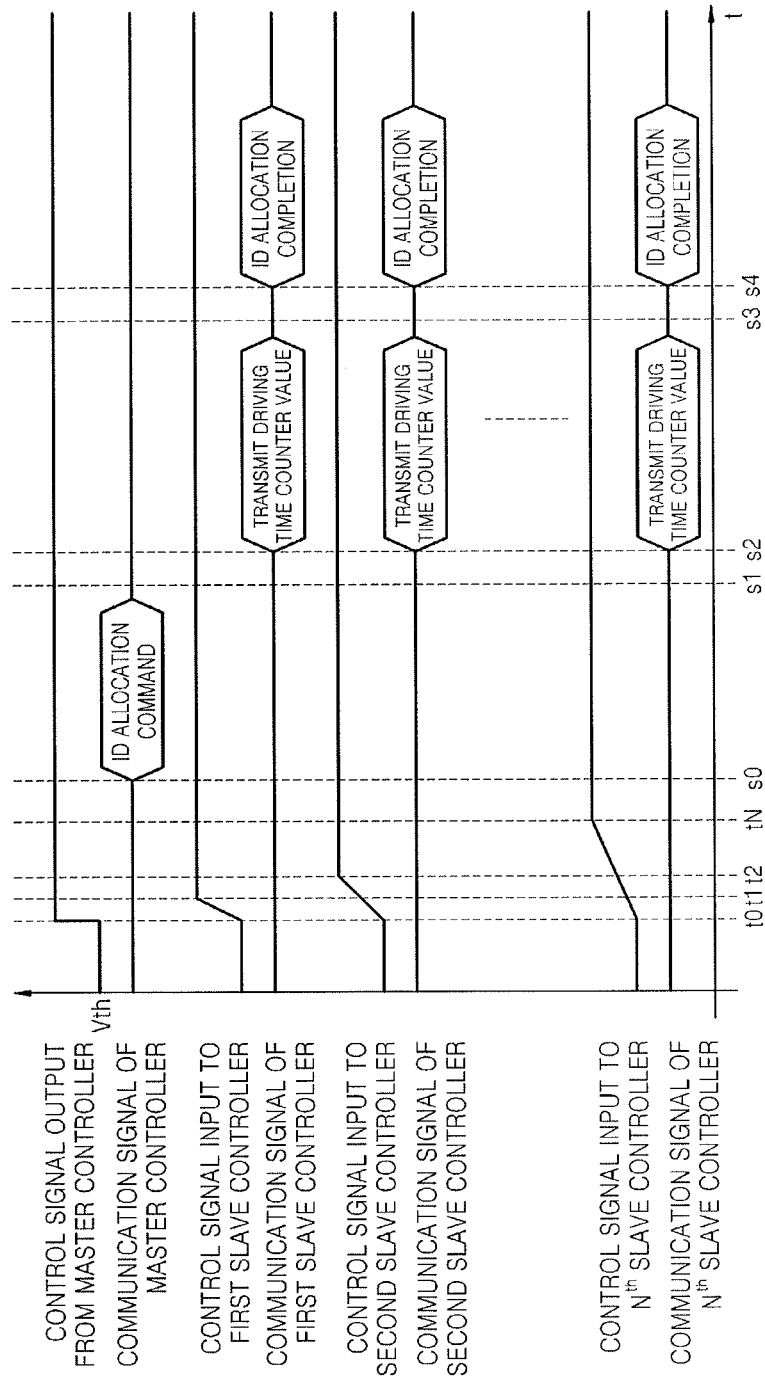
FIG. 12 is a timing diagram illustrating a method of allocating identifiers (IDs) corresponding to physical connection orders to slave controllers in the communication system of FIG. 6, according to an example embodiment.

FIG. 12 is a timing diagram illustrating a method of allocating IDs corresponding to physical connection orders of slave controllers in the communication system 600 of FIG. 6, according to an example embodiment.

In the example embodiment shown in FIG. 12, when the master controller 610 activates a control signal at a time t0, the slave controllers 620-1 through 620-$n$ are sequentially activated in response to the activated control signal.

As shown in FIG. 12, although the master controller 610 transmits the control signal to a high level at the time t0, a voltage V1 of the first slave controller 620-1 does not reach a driving voltage Vth until a time t1, due to the delay circuits 630. A voltage V2 of the second slave controller 620-2 reaches the driving voltage Vth at a time t2. According to this method, a voltage VN of the $n^{th}$ slave controller 620-$n$ reaches the driving voltage Vth at a time tN. Thus, the MPUs 640 of the slave controllers 620-1 through 620-$n$ are sequentially activated according to the physical connection order of the slave controllers 620-1 through 620-$n$. When the MPUs 640 of the slave controllers 620-1 through 620-$n$ are activated, the driving time counters 645 of the MPUs 640 start to operate. The driving time counter 635 may count the amount of time that has elapsed after the activation of the MPUs 640.

The master controller 610 issues an ID allocation command at a preset time s0. The preset time s0 may be determined so that the MPUs 640 of the slave controllers 620-1 through 620-$n$ are activated. The ID allocation command is simultaneously provided as a communication signal to all of the slave controllers 620-1 through 620-$n$. The ID allocation command may be provided according to a broadcasting method.

The slave controllers 620-1 through 620-$n$ receive the ID allocation command at a time s1 and store driving time counter values of the driving time counters 645. Since the slave controllers 620-1 through 620-$n$ are sequentially activated in the order of the first slave controller 620-1 to the $n^{th}$ slave controller 620-$n$, the driving time counter value of the first slave controller 620-1 may be the greatest, and the driving time counter value of the $n^{th}$ slave controller 620-$n$ may be the smallest at a given time.

For example, at the time s1 when the slave controllers 620-1 through 620-$n$ receive the ID allocation command, the driving time counter value of the first slave controller 620-1 may be 1300, the driving time counter value of the second slave controller 620-2 may be 1200, the driving time counter value of the third slave controller 620-3 may be 1100, and the driving time counter value of the $n^{th}$ slave controller 620-$n$ may be 600.

At a time s2, the slave controllers 620-1 through 620-$n$ transmit the driving time counter values stored at the time s1 as communication signals to the other slave controllers 620-1 through 620-$n$. The slave controllers 620-1 through 620-$n$ simultaneously transmit the driving time counter values at the time s2, but the order in which the driving time counter values are transmitted may be determined according to priorities of communication controllers of the MPUs 640. The priorities may be determined by the IDs. For this purpose, the slave controllers 620-1 through 620-$n$ may use the stored driving time counter values as arbitrary IDs to output communication signals including the driving time counter values.

At a time s3, the slave controllers 620-1 through 620-$n$ receive driving time counter values of the other slave controllers 620-1 through 620-$n$ and compare their driving time counter values with the received driving time counter values to determine their IDs. A method of comparing the driving time counter values of the slave controllers 620-1 through 620-$n$ with the received driving time counter values to determine the IDs of the slave controllers 620-1 through 620-$n$ will be described below in more detail with reference to FIG. 15.

At a time s4, the slave controllers 620-1 through 620-$n$ transmit ID allocation completion messages indicating that their IDs are allocated. The master controller 610 receives the ID allocation completion messages and performs communications based on allocated IDs.

Figure 13:
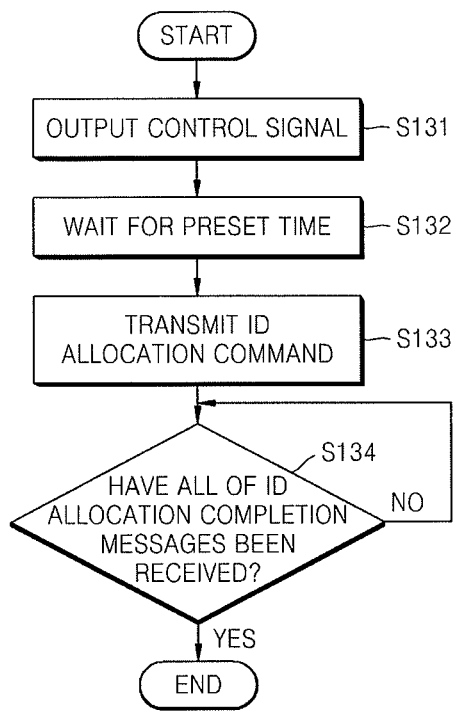
FIG. 13 is a flowchart illustrating an operation of a master controller performed in the communication system of FIG. 6, according to an example embodiment.

FIG. 13 is a flowchart illustrating an operation of the master controller 610 in the communication system 600 of FIG. 6, according to an example embodiment.

In the example embodiment shown in FIG. 13, in operation S131, the master controller 610 outputs a control signal. As shown in FIG. 12, the master controller 610 may output the control signal that is activated at the time t0. The activated control signal sequentially reaches the slave controllers 620-1 through 620-$n$ due to the delay circuits 630. The slave controllers 620-1 through 620-$n$ are activated according to reaching orders of the activated control signal.

In operation S132, the master controller 610 waits for a preset time until it transmits an ID allocation command to all of the slave controllers 620-1 through 620-$n$.

In operation S133, the master controller 610 transmits an ID allocation command to all of the slave controllers 620-1 through 620-$n$. The ID allocation command may include information about the total number of the slave controllers 620-1 through 620-$n$. The master controller 610 may transmit a message including the information about the total number of the slave controllers 620-1 through 620-$n$, besides the ID allocation command.

The slave controllers 620-1 through 620-$n$ receive the ID allocation command and allocate IDs by using driving time counter values of internal driving time counters. Once all of the IDs have been completely allocated, the slave controllers 620-1 through 620-$n$ transmit ID allocation end messages.

In operation S134, the master controller 610 determines whether the master controller 610 has received the ID allocation end messages from all of the slave controllers 620-1 through 620-$n$ and, when the master controller 610 has received the ID allocation end messages from the all of the slave controllers 620-1 through 620-$n$, communicates with the slave controllers 620-1 through 620-$n$ by using newly allocated IDs.

Figure 14:
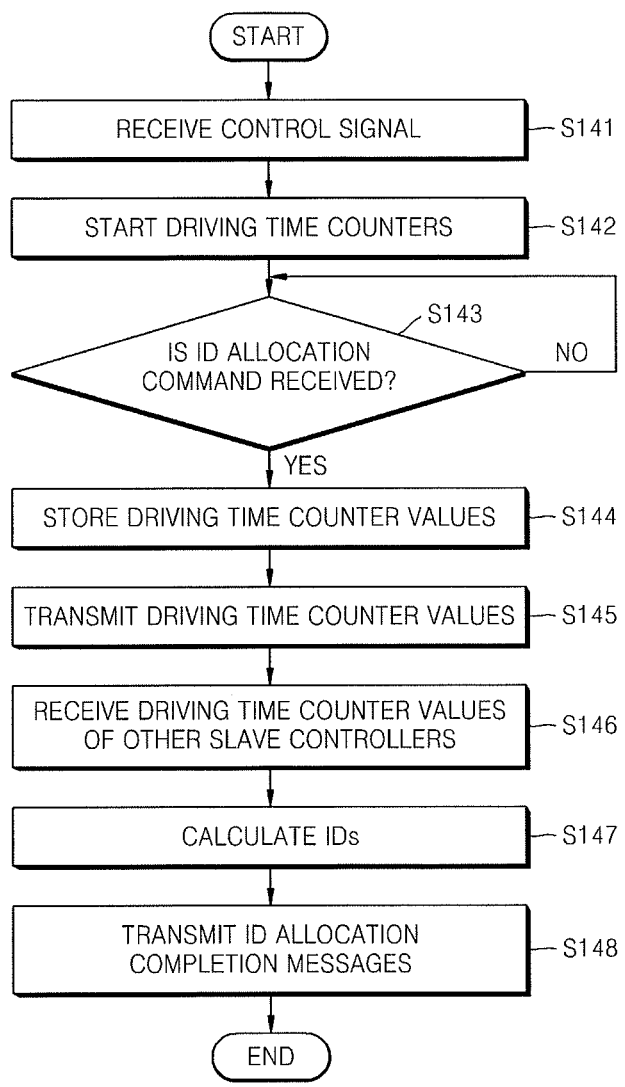
FIG. 14 is a flowchart illustrating an operation of a slave controller in the communication system of FIG. 6, according to an example embodiment.

FIG. 14 is a flowchart illustrating operations of the slave controllers 620-1 through 620-$n$ in the communication system 600 of FIG. 6, according to an example embodiment.

In the example embodiment shown in FIG. 14, in operation S141, the slave controllers 620-1 through 620-$n$ receive a control signal output from the master controller 610. As described above, the slave controllers 620-1 through 620-$n$ sequentially receive the control signal due to delay circuits of the slave controllers 620-1 through 620-n.

In operation S142, the slave controllers 620-1 through 620-n operate their respective driving time counters in response to the received control signal. The driving time counters count the amount of time that elapses following the control signal is received.

In operation S143, the slave controllers 620-1 through 620-n increase the driving time counter values of their respective driving time counters until the slave controllers 620-1 through 620-n receive the ID allocation command.

Once the slave controllers 620-1 t through 620-n receive the ID allocation command, the slave controllers 620-1 through 620-n store the driving time counter values of their respective driving time counters in operation S144. In the case that the ID allocation command includes information about the total number of the slave controllers 620-1 through 620-n or in the case that a message including the information about the total number of the slave controllers 620-1 through 620-n is received, the slave controllers 620-1 through 620-n may acquire the information about the total number of the slave controllers 620-1 through 620-n.

In operation S145, the slave controllers 620-1 through 620-n transmit the stored driving time counter values to other slave controllers 620-1 through 620-n.

In operation S146, the slave controllers 620-1 through 620-n receive the driving time counter values of the slave controllers 620-1 through 620-n from the other slave controllers 620-1 through 620-n.

In operation S147, the slave controllers 620-1 through 620-n compare the stored driving time counter values with the driving time counter values received from the other slave controllers 620-1 through 620-n to calculate their IDs.

In operation S148, each of the slave controllers 620-1 through 620-n allocates its calculated ID to itself and transmits an ID allocation message to the master controller 610.

Figure 15:
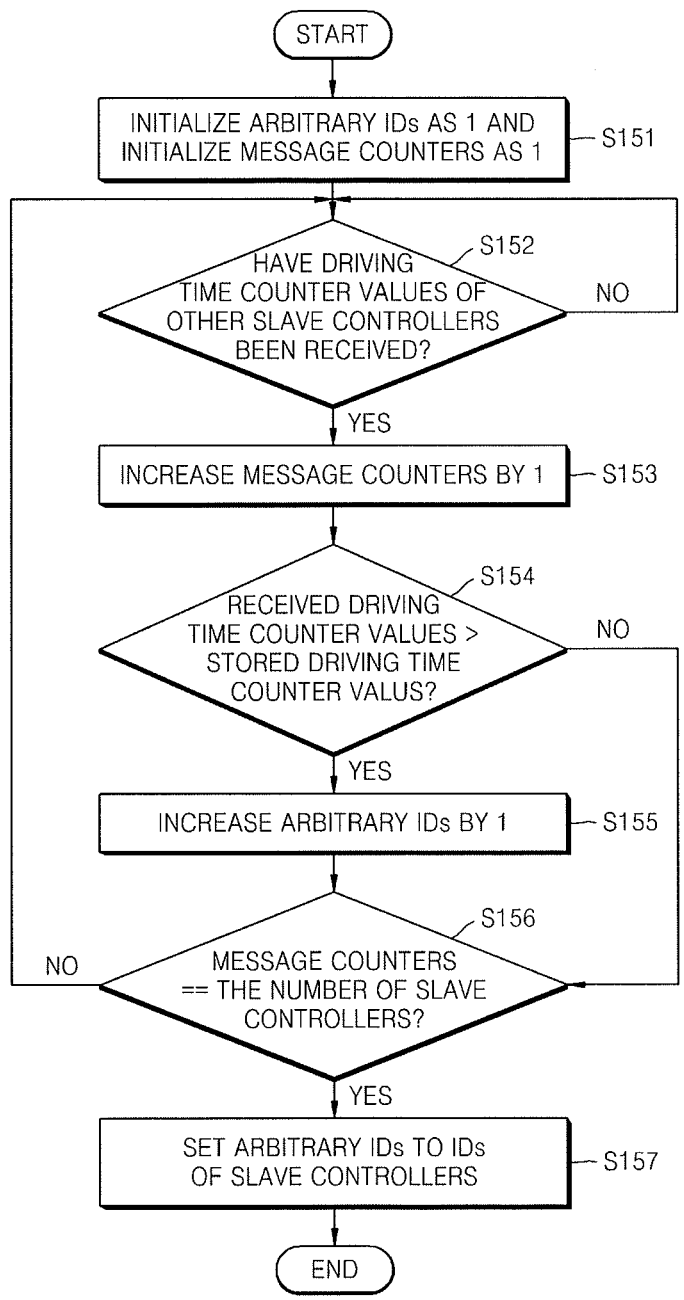
FIG. 15 is a flowchart illustrating a process in which a slave controller in the communication system of FIG. 6 calculates an ID, according to an example embodiment.

FIG. 15 is a flowchart illustrating a process in which the slave controllers 620-1 through 620-n in the communication system 600 of FIG. 6 calculate IDs, according to an example embodiment.

In the example embodiment shown in FIG. 15, in operation S151, the slave controllers 620-1 through 620-n initialize arbitrary IDs as 1 and initialize message counters as 1. As described above, the slave controllers 620-1 through 620-n may acquire information about the total number of the slave controllers 620-1 through 620-n from the master controller 610. The slave controllers 620-1 through 620-n store their driving time counter values in operation S144 of FIG. 14.

In operation S152, the slave controllers 620-1 through 620-n receive driving time counter values from other slave controllers 620-1 through 620-n.

When the slave controllers 620-1 through 620-n receive the driving time counter values from the other slave controllers 620-1 through 620-n in operation S152, the slave controllers 620-1 through 620-n increase their respective message counters by 1 in operation S153.

In operation S154, the slave controllers 620-1 through 620-n compare the driving time counter values received in operation S152 with their respective driving time counter values stored in operation S144.

When the driving time counter values received from the slave controllers 620-1 through 620-n in operation S152 are greater than the driving time counter values stored in operation S144, the slave controllers 620-1 through 620-n increase their respective arbitrary IDs by 1. When the driving time counter values received in operation S152 are not greater than the driving time counter values stored in operation S144, the slave controllers 620-1 through 620-n do not increase the arbitrary IDs but go to operation S156.

In operation S156, the slave controllers 620-1 through 620-n determine whether the message counters correspond to the total number of the slave controllers 620-1 through 620-n. When the message counters correspond to the total number of the slave controllers 620-1 through 620-n, the slave controllers 620-1 through 620-n proceed to operation S157. When the message counters do not correspond to the total number of the slave controllers 620-1 through 620-n, the slave controllers 620-1 through 620-n proceed to operation S152.

Since the message counters correspond to the total number of the slave controllers 620-1 through 620-n, and there are no other driving time counter values of the other slave controllers 620-1 through 620-n to be received, the slave controllers 620-1 through 620-n set the arbitrary IDs to their IDs. Therefore, the IDs are completely allocated, and the slave controllers 620-1 through 620-n transmit the ID allocation completion messages to the master controller 610 in operation S148.

The total number of the slave controllers 620-1 through 620-n may be 8, and driving time counter values of the first through eighth slave controllers 620-1 through 620-8 may be respectively 800, 700, 600, 500, 400, 300, 200, and 100.

The stored driving time counter value of the fifth slave controller 620-5 is 400. The fifth slave controller 620-5 increases an arbitrary ID when the driving time counter values 800, 700, 600, and 500 of the first, second, third, and fourth slave controllers 620-1, 620-2, 620-3, and 620-4 are received. Since the arbitrary IDs of the other slave controllers 620-1 through 620-4 and 620-6 through 620-8 are initialized as 1, their arbitrary IDs are increased by 1 four times. When all of driving time counter values are received from the other slave controllers 620-1 through 620-4 and 620-6 through 620-8, the arbitrary IDs are 5. Thus, the fifth slave controller 620-6 has the same ID as its physical connection order.

Therefore, the slave controllers 620-1 through 620-n may further include additional circuits for detecting physical connection orders or may manage the IDs to allocate IDs corresponding to the physical connection orders. The slave controllers 620-1 through 620-n may check their physical connection orders by themselves according to a method of the present invention and allocate IDs corresponding to the physical connection orders. Accordingly, the slave controllers 620-1 through 620-n may be compatibly used while avoiding restrictions, and manufacturing cost may not be increased by additional circuits, and additional management may be omitted.

By way of summation and review, an energy storage system may be implemented as a system that connects a generation system that generates newly generated energy, a battery system that stores power, and an existing grid system to each other.

In an energy storage system, the battery system may be variously designed according to an amount of load which is supplied with power by the batter system. The battery system is supplied with power from an external source, stores the power, and supplies the power to the outside. Thus, the battery system performs charging and discharging operations.

The battery system may monitor an internal state to perform a stable operation and may collect data measured through the monitoring. The battery system may include various types of battery managers having master-slave structures. The battery managers (or slave controllers) corresponding to slaves transmit measured data to the battery manager (or master controller), and the master controller receives and collects the data.

The slave controllers may respectively have identifiers (IDs) so that the master controller can identify the slave controllers. The IDs may be determined to correspond to connection orders of the slave controllers, for simplicity. However, if an additional circuit or apparatus capable of detecting the connection orders or positions of the slave controllers is added, so that the slave controllers respectively have the IDs corresponding to the connection orders, the price of the product may be increased. Otherwise, hardware of the slave controllers may be different, or software may be used to allocate the IDs corresponding to the connection orders to the slave controllers, which may mitigate the need for additional circuits or apparatuses, but such an approach may involve software development and management, for each of the slave controllers, with respect to the hardware or software.

As used herein, the uses of the term "the" and an indicating term similar to the term "the" in the specification or claims may correspond to both the singular number and the plural number. If a range is described, individual values belonging to the range are implied unless stated otherwise, i.e., the individual values constituting the range are described herein. If an order of operations constituting a method is not clearly described or there is no description in contrast to the order, the operations may be performed in any appropriate order. Embodiments are not necessarily limited to the description order of the operations. The uses of all examples or example terms (for example, "etc.") are simply for describing example embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery management system, comprising:
a plurality of slave controllers, each slave controller of the plurality of slave controllers being coupled to a respective battery module, each of the slave controllers having a slave controller identifier, the respective slave controller identifiers being allocated by a slave controller identifier allocation operation performed by the plurality of slave controllers; and
a master controller, the master controller being coupled to each of the slave controllers, the master controller receiving the slave controller identifiers from the slave controllers,
wherein:
the plurality of slave controllers includes a serial interconnection such that each slave controller of the plurality of slave controllers is wired together in sequence by the serial interconnection,
each slave controller of the plurality of slave controllers sequentially receives a control signal on the serial interconnection and outputs the control signal after a delay to a subsequent slave controller, and
each respective slave controller determines a relative position along the serial interconnection according to a delay of the control signal received by the respective slave controller.

2. The battery management system as claimed in claim 1, wherein the plurality of slave controllers allocates the slave controller identifiers according to a connection order of the slave controllers.

3. The battery management system as claimed in claim 1, wherein the control signal is progressively delayed by each slave controller such that a final slave controller of the plurality of slave controllers wired together in sequence receives a most-delayed control signal among the plurality of slave controllers.

4. The battery management system as claimed in claim 1, wherein each slave controller includes a driving time counter, the driving time counter starting counting when the control signal is received by the slave controller.

5. The battery management system as claimed in claim 4, wherein the driving time counter is controlled by a microprocessor in the slave controller, the microprocessor initiating the driving time counter when the slave controller receives the control signal.

6. The battery management system as claimed in claim 1, wherein each slave controller includes a delay circuit for delaying the control signal, the delay circuit including a circuit selected from the group of a resistor-capacitor (RC) delay circuit, a resistor-inductor (RL) delay circuit, and a buffer circuit.

7. The battery management system as claimed in claim 1, wherein each slave controller of the plurality of slave controllers sets its own slave controller identifier and supplies the set slave controller identifier to the master controller.

8. An energy storage system coupled between a power generation system, a load, and a grid system, the energy storage system comprising the battery management system as claimed in claim 1.

9. A vehicle comprising the battery management system as claimed in claim 1.

10. A battery management system, comprising:
a plurality of slave controllers, each slave controller of the plurality of slave controllers being coupled to a respective battery module, each of the slave controllers having a slave controller identifier, the respective slave controller identifiers being allocated by a slave controller identifier allocation operation performed by the plurality of slave controllers; and
a master controller, the master controller being coupled to each of the slave controllers, the master controller receiving the slave controller identifiers from the slave controllers,
wherein:
the plurality of slave controllers includes a first slave controller and at least one subsequent slave controller, the subsequent slave controller receiving a control signal after a delay from an immediately-preceding slave controller,
each slave controller includes a driving time counter activated according to the received control signal, and
each slave controller of the plurality of slave controllers receives a driving time counter value from at least one other slave controller of the plurality of slave controllers and compares the received driving time counter value with a driving time counter value from its driving time counter.

11. The battery management system as claimed in claim 10, wherein, when the comparing indicates that the received driving time counter value is a larger value, the slave controller increments its slave controller identifier such that the first slave controller has a lowest slave controller identifier and successive slave controllers have successively larger slave controller identifiers.

12. A method of managing a battery system that includes a plurality of slave controllers that are sequentially connected and a master controller, the method comprising:
in the master controller, transmitting a control signal to a first slave controller of the plurality of slave controllers;
in each slave controller of the plurality of slave controllers, receiving the control signal, activating a respective driving time counter in response to the control signal, and outputting the control signal after a delay to a subsequent slave controller among the plurality of slave controllers, the control signal sequentially arriving at each slave controller of the plurality of slave controllers;
in the master controller, transmitting a slave controller identifier allocation command to each slave controller of the plurality of slave controllers at the same time;
in each slave controller of the plurality of slave controllers, storing a driving time counter value of the respective driving time counter in response to the slave controller identifier allocation command;
in each slave controller of the plurality of slave controllers, comparing the stored driving time counter value to at least one other driving time counter value received from another among the plurality of slave controllers; and
in each slave controller of the plurality of slave controllers, setting a slave controller identifier based on the compared driving time counter values.

13. The method as claimed in claim 12, further comprising: in the master controller, after transmitting the slave controller identifier allocation command, receiving the set slave controller identifiers from each slave controller of the plurality of slave controllers.

14. The method as claimed in claim 12, wherein, when the comparing indicates that a received driving time counter value is a larger value, the slave controller increments its slave controller identifier.

15. The method as claimed in claim 14, wherein a first slave controller among the sequentially connected slave controllers sets a lowest slave controller identifier and successive slave controllers set successively larger slave controller identifiers.

16. The method as claimed in claim 12, wherein each slave controller of the plurality of slave controllers transmits its stored driving time counter value to all other slave controllers of the plurality of slave controllers.

17. A method of managing a battery system that includes a master controller and a plurality of slave controllers that are sequentially connected to the master controller, the method comprising:
in the master controller, sequentially providing a driving power to the plurality of slave controllers;
in each slave controller of the plurality of slave controllers, sequentially initiating an operation by receiving the driving power, and sequentially activating a respective driving time counter;
in the master controller, transmitting a slave controller identifier allocation command to each slave controller of the plurality of slave controllers at the same time;
in each slave controller of the plurality of slave controllers, storing a driving time counter value of the respective driving time counter in response to the slave controller identifier allocation command received by the slave controller;
in each slave controller of the plurality of slave controllers, comparing the stored driving time counter value to at least one other driving time counter value received from another among the plurality of slave controllers; and
in each slave controller of the plurality of slave controllers, setting a slave controller identifier based on the compared driving time counter values.

* * * * *